US012623665B2

(12) United States Patent
Marumo et al.

(10) Patent No.: US 12,623,665 B2
(45) Date of Patent: May 12, 2026

(54) DRIVE ASSIST APPARATUS

(71) Applicant: SUBARU CORPORATION, Tokyo (JP)

(72) Inventors: Hiroki Marumo, Tokyo (JP); Fumiya Sato, Tokyo (JP); Mika Suzuki, Tokyo (JP); Tomohiro Abe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 443 days.

(21) Appl. No.: 17/875,024

(22) Filed: Jul. 27, 2022

(65) Prior Publication Data

US 2023/0060112 A1     Feb. 23, 2023

(30) Foreign Application Priority Data

Aug. 17, 2021     (JP) ................................. 2021-132580

(51) Int. Cl.
*B60W 30/09*        (2012.01)
*B60W 30/18*        (2012.01)
*B60W 40/02*        (2006.01)
(52) U.S. Cl.
CPC ............ *B60W 40/02* (2013.01); *B60W 30/09* (2013.01); *B60W 30/18172* (2013.01);
(Continued)
(58) Field of Classification Search
CPC .. B60W 40/02; B60W 30/09; B60W 2552/15; B60W 2555/20; B60W 2552/40
See application file for complete search history.

(56) References Cited

U.S. PATENT DOCUMENTS 8,655,579 B2 * 2/2014 Sakugawa .............. G08G 1/166
                                                701/301
10,915,105 B1 * 2/2021 Likhterman ....... B60W 60/0011
                        (Continued)

FOREIGN PATENT DOCUMENTS

CN        108931978 A  * 12/2018  ......... B60R 21/0134
DE    102020122374 A1 *  7/2021  ............. B60L 58/12
                        (Continued)

OTHER PUBLICATIONS

Jei Hun Lee, machine translation for KR 20150067448, Jun. 18, 2015, espacenet.com (Year: 2015).*
(Continued)

*Primary Examiner* — Donald J Wallace
*Assistant Examiner* — Alex B Griffin
(74) *Attorney, Agent, or Firm* — Rimon P.C.

(57)        ABSTRACT

A drive assist apparatus configured to set a drive condition of a vehicle based on a risk map generated by giving a risk potential to a risk object that is present around the vehicle, includes one or more processors and one or more memories connected to the one or more processors to be able to communicate with the one or more processors. The one or more processors is configured to execute a process including: obtaining information on a surrounding environment of the vehicle; obtaining information on an external environmental factor that may cause deviation of a drive track of the vehicle; and expanding a setting range of the risk potential of the risk object which is positioned in a direction of the expected deviation based on the information on the external environmental factor.

14 Claims, 19 Drawing Sheets

(52) U.S. Cl.
CPC ..... *B60W 2552/15* (2020.02); *B60W 2552/40* (2020.02); *B60W 2555/20* (2020.02)

(56) References Cited

U.S. PATENT DOCUMENTS

| | | | |
|---|---|---|---|
| 11,068,998 B1* | 7/2021 | Slusar | G01C 21/3667 |
| 2013/0033368 A1* | 2/2013 | Fukamachi | G08G 1/165 |
| | | | 340/425.5 |
| 2017/0186319 A1* | 6/2017 | Tsushima | B60W 30/0956 |
| 2017/0364080 A1* | 12/2017 | Chintakindi | B60Q 1/50 |
| 2019/0205609 A1* | 7/2019 | Taveira | G08G 5/80 |
| 2020/0247426 A1* | 8/2020 | Rafferty | B60W 50/14 |
| 2021/0213948 A1* | 7/2021 | Lahti | B60W 30/162 |
| 2021/0291829 A1* | 9/2021 | Komuro | B60W 10/20 |
| 2022/0097713 A1* | 3/2022 | Neubecker | B60W 40/02 |
| 2024/0158009 A1* | 5/2024 | Sugawara | B62D 6/04 |

FOREIGN PATENT DOCUMENTS

| | | | | |
|---|---|---|---|---|
| JP | 2018-020775 A | | 2/2018 | |
| JP | 2018-192954 A | | 12/2018 | |
| JP | 2021-011152 A | | 2/2021 | |
| KR | 20150067448 A | * | 6/2015 | |
| KR | 20210065409 A | * | 6/2021 | B60W 40/02 |

OTHER PUBLICATIONS

Office Action dated Apr. 22, 2025, issued in corresponding Japanese Application No. 2021-132580, 5 pages.
Office Action dated Feb. 12, 2025, issued in corresponding Japanese Patent Application No. 2021-132580, 5 pages.

* cited by examiner

Figure 9:
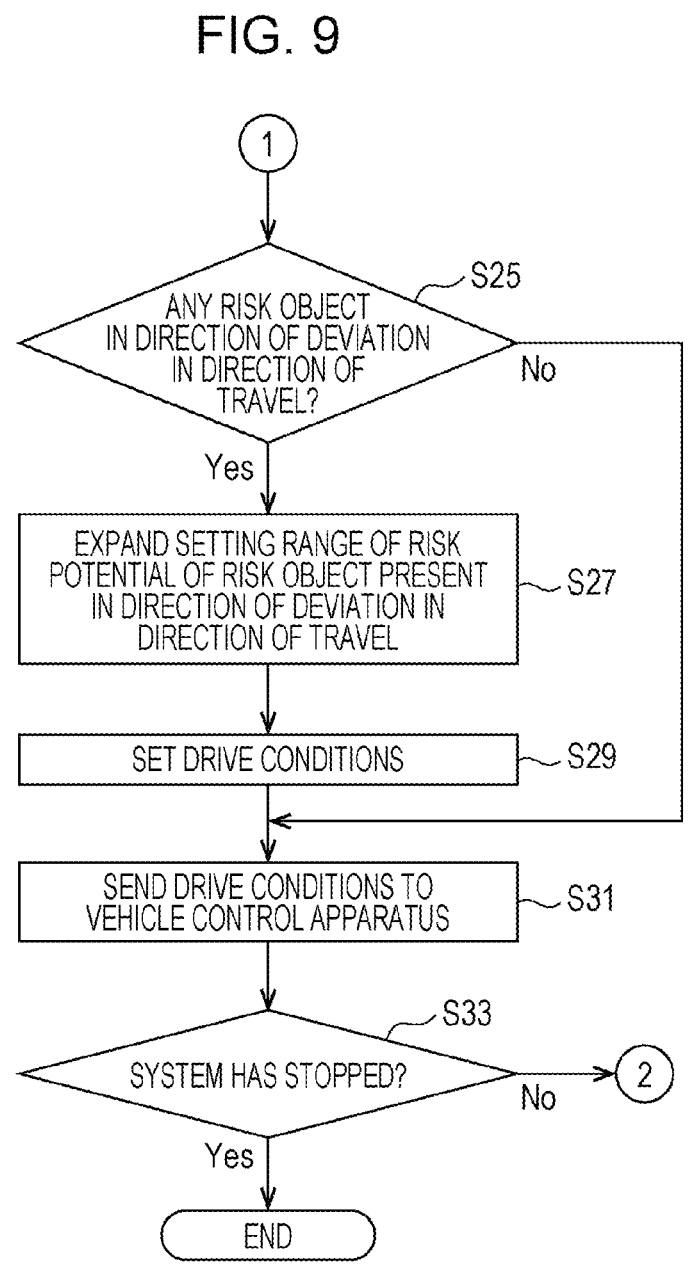

ANY RISK OBJECT
IN DIRECTION OF DEVIATION
IN DIRECTION OF
TRAVEL? ⟋ S25

No

Yes

EXPAND SETTING RANGE OF RISK
POTENTIAL OF RISK OBJECT PRESENT
IN DIRECTION OF DEVIATION IN
DIRECTION OF TRAVEL — S27

SET DRIVE CONDITIONS — S29

SEND DRIVE CONDITIONS TO
VEHICLE CONTROL APPARATUS — S31

SYSTEM HAS STOPPED? ⟋ S33

No → ②

Yes

END

DRIVE ASSIST APPARATUS

CROSS-REFERENCE TO RELATED APPLICATIONS

The present application claims priority from Japanese Patent Application No. 2021-132580 filed on Aug. 17, 2021, the entire contents of which are hereby incorporated by reference.

BACKGROUND

The disclosure relates to a drive assist apparatus configured to set a drive condition of a vehicle by taking into consideration the risks that are present around the vehicle.

There has been known a drive assist apparatus configured to set the drive track or vehicle speed of a vehicle by taking into consideration the risks that are present around the vehicle. For example, Japanese Unexamined Patent Application Publication (JP-A) No. 2018-192954 proposes a drive assist apparatus configured to set a drive track by taking into consideration the risks that have not become apparent in addition to the risks that are apparent. In one example, JP-A 2018-192954 discloses a drive assist apparatus configured to calculate each of a basic potential indicating the degree of recommendation of a drive position in the case where a vehicle drives in accordance with a road shape, an apparent potential based on an apparent risk indicated by risk object information, and a latent potential based on a latent risk predicted from a result of predicting a drive scene of the vehicle, and to set a drive path for the vehicle to drive on the basis of a potential field obtained by adding the basic potential, the apparent potential, and the latent potential.

SUMMARY

An aspect of the disclosure provides a drive assist apparatus configured to set a drive condition of a vehicle based on a risk map generated by giving a risk potential to a risk object that is present around the vehicle. The drive assist apparatus includes one or more processors and one or more memories connected to the one or more processors to be able to communicate with the one or more processors. The one or more processors are configured to execute a process including: obtaining information on a surrounding environment of the vehicle; obtaining information on an external environmental factor that may cause expected deviation of a drive track of the vehicle; and expanding a setting range of the risk potential of the risk object which is positioned in a direction of the expected deviation based on the information on the external environmental factor.

An aspect of the disclosure provides a drive assist apparatus configured to set a drive condition of a vehicle based on a risk map generated by giving a risk potential to a risk object that is present around the vehicle. The drive assist apparatus includes an obtaining unit, a risk map generator, and a drive condition setter. The obtaining unit is configured to obtain information on a surrounding environment of the vehicle, and information on an external environmental factor that may cause expected deviation of a drive track of the vehicle. The risk map generator is configured to generate a risk map by expanding a setting range of the risk potential of the risk object which is positioned in a direction of the expected deviation based on the information on the external environmental factor. The drive condition setter is configured to set a drive condition of the vehicle based on the risk map.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIG. 9 is a flowchart illustrating a processing operation of the drive assist apparatus of the first embodiment;

DETAILED DESCRIPTION

JP-A 2018-192954 describes that the magnitude of a risk changes depending on the road environment, weather conditions, and the like, and that, as a specific example, the latent risk of jumping out from a blind spot changes depending on the presence or absence of guardrails and the size of the road width. However, a drive assist apparatus of JP-A 2018-192954 does not take into consideration that the drive track of a vehicle deviates from a control target due to an external environmental factor. In one example, the drive assist apparatus of JP-A 2018-192954 performs risk calculations based on apparent risks and latent risks in the case where the vehicle drives along the control target, and does not take into considerations the risks in the case where the drive track of the vehicle deviates due to an external environmental factor. For this reason, in the case where a drive condition of a vehicle is set on the basis of a drive path set by the drive assist apparatus of JP-A 2018-192954, due to the frozen road surfaces, road slope, and strong winds, the drive track of the vehicle may deviate and approach a risk object, which may make the occupant(s) of the vehicle feel uneasy.

It is desirable to provide a drive assist apparatus capable of setting a drive condition of a vehicle by performing risk calculations that take into consideration the deviation of a drive track of the vehicle due to an external environmental factor.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. First Embodiment 1-1. Overall Configuration of Vehicle

Firstly, an example of the overall configuration of a vehicle to which a drive assist apparatus according to a first embodiment of the disclosure is applicable will be described.

Figure 1:
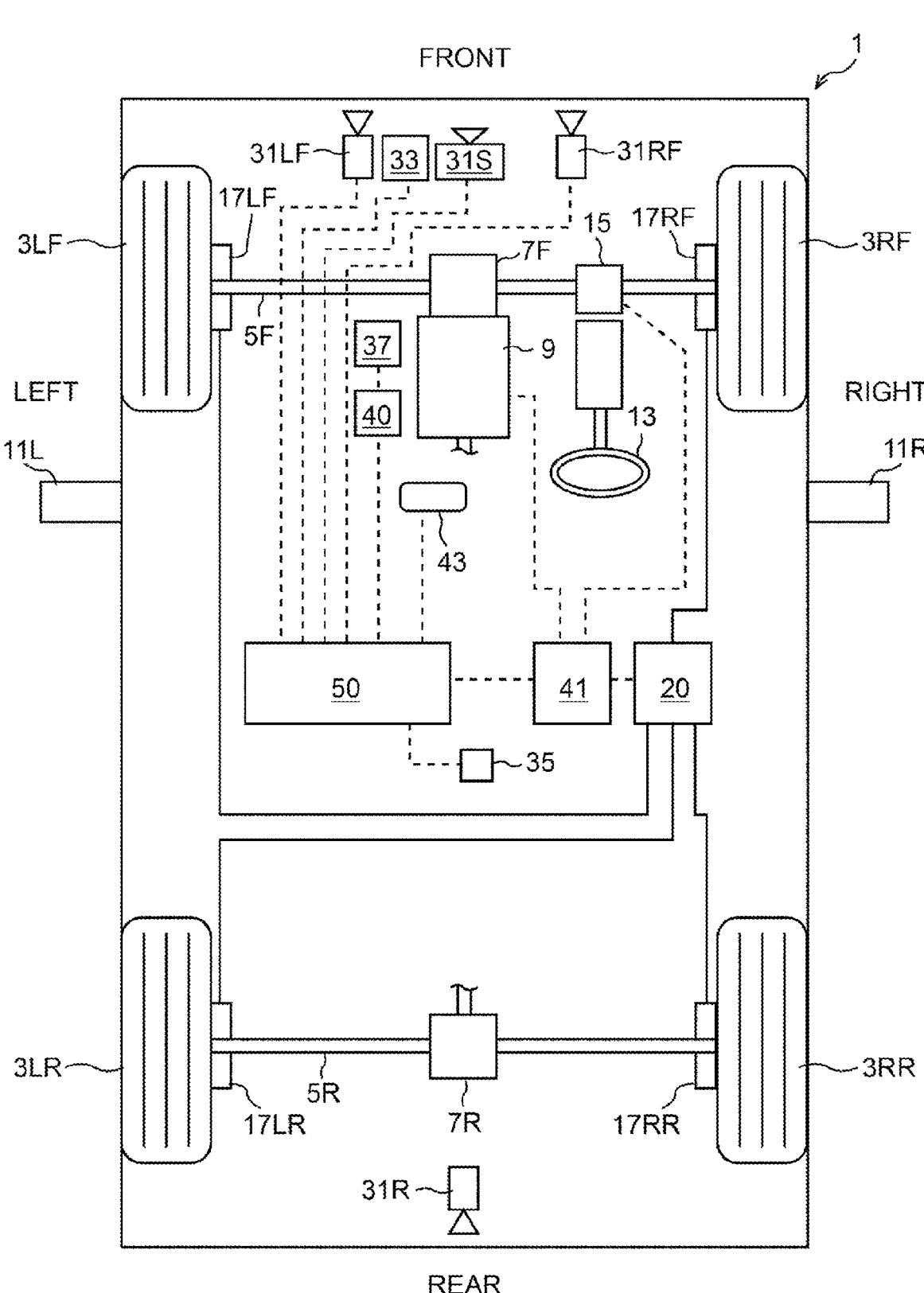
FIG. 1 is a schematic diagram illustrating an exemplary configuration of a vehicle including a drive assist apparatus according to a first embodiment of the disclosure.

FIG. 1 is a schematic diagram illustrating an exemplary configuration of a vehicle 1 including a drive assist apparatus 50 according to the present embodiment. The vehicle 1 illustrated in FIG. 1 is configured as a four-wheel-drive vehicle that transmits a drive torque output from a drive power source 9, which generates a vehicle drive torque, to a left front wheel 3LF, a right front wheel 3RF, a left rear wheel 3LR, and a right rear wheel 3RR (hereinafter they may be collectively referred to as "wheels 3" when it is unnecessary to make distinctions among them). The drive power source 9 may be an internal combustion engine such as a gasoline engine or a diesel engine, or a drive motor, or may be equipped with both an internal combustion engine and a drive motor.

Note that the vehicle 1 may be, for example, an electric automobile equipped with two drive motors, a front-wheel drive motor and a rear-wheel drive motor, or may be an electric automobile equipped with drive motors individually for the wheels 3. In addition, in the case where the vehicle 1 is an electric automobile or a hybrid electric automobile, the vehicle 1 is equipped with a secondary battery that stores power supplied to the drive motors, and a generator such as a motor or a fuel cell that generates power charged in the battery.

The vehicle 1 includes, as equipment used for the drive control of the vehicle 1, the drive power source 9, an electric steering apparatus 15, and a brake fluid pressure control unit 20. The drive power source 9 outputs a drive torque transmitted to a front wheel drive shaft 5F and a rear wheel drive shaft 5R via a transmission (not illustrated), a front wheel differential mechanism 7F, and a rear wheel differential mechanism 7R. Driving of the drive power source 9 and the transmission is controlled by a vehicle control apparatus 41, which includes one or more electronic control units (ECUs).

The front wheel drive shaft 5F is provided with the electric steering apparatus 15. The electric steering apparatus 15 includes an electric motor and a gear mechanism (not illustrated), and, under control of the vehicle control apparatus 41, adjusts the steering angle of the left front wheel 3LF and the right front wheel 3RF. During manual drive, the vehicle control apparatus 41 controls the electric steering apparatus 15 on the basis of the steering angle of a steering wheel 13 by a driver. During autonomous drive, the vehicle control apparatus 41 controls the electric steering apparatus 15 on the basis of a target steering angle set by the drive assist apparatus 50.

A brake system of the vehicle 1 is configured as a hydraulic brake system. The brake fluid pressure control unit 20 generates a braking force by adjusting hydraulic pressures supplied to brake calipers 17LF, 17RF, 17LR, and 17RR (hereinafter they may be collectively referred to as "brake calipers 17" when it is unnecessary to make distinctions among them), which are provided in the front and rear and left and right drive wheels 3LF, 3RF, 3LR, and 3RR, respectively. Driving of the brake fluid pressure control unit 20 is controlled by the vehicle control apparatus 41. In the case where the vehicle 1 is an electric automobile or a hybrid electric automobile, the brake fluid pressure control unit 20 is used in combination with regenerative braking by the drive motors.

The vehicle control apparatus 41 includes one or more ECUs that control the driving of the drive power source 9, which outputs a drive torque of the vehicle 1, the electric steering apparatus 15, which controls the steering angle of the steering wheel 13 or the steered wheels, and the brake fluid pressure control unit 20, which controls the braking force of the vehicle 1. The vehicle control apparatus 41 may have the function of controlling the driving of the transmission, which changes the speed of the drive torque from the drive power source 9 and transmits it to the wheels 3. The vehicle control apparatus 41 is configured to be capable of obtaining information sent from the drive assist apparatus 50, and is configured to be able to execute autonomous drive control of the vehicle 1. In addition, during manual drive of the vehicle 1, the vehicle control apparatus 41 obtains information on the amount of operation by the driver's driving, and controls the driving of the drive power source 9, which outputs a drive torque of the vehicle 1, the electric steering apparatus 15, which controls the steering angle of the steering wheel 13 or the steered wheels, and the brake fluid pressure control unit 20, which controls the braking force of the vehicle 1.

The vehicle 1 also includes front imaging cameras 31LF and 31RF, a rear imaging camera 31R, a light detection and ranging (LiDAR) 31S, a road surface detection sensor 33, a vehicle state sensor 35, a global positioning system (GPS) sensor 37, a navigation system 40, and a human machine interface (HMI) 43.

The front imaging cameras 31LF and 31RF, the rear imaging camera 31R, and the LiDAR 31S form surrounding environment sensors for obtaining information on the surrounding environment of the vehicle 1. The front imaging cameras 31LF and 31RF and the rear imaging camera 31R image the front and the rear, respectively, of the vehicle 1, and generate image data. The front imaging cameras 31LF and 31RF and the rear imaging camera 31R include imaging devices such as charge-coupled devices (CCDs) or complementary metal-oxide semiconductor (CMOS), and send the generated image data to the drive assist apparatus 50.

In the vehicle 1 illustrated in FIG. 1, the front imaging cameras 31LF and 31RF are configured as a stereo camera including a pair of left and right cameras, and the rear imaging camera 31R is configured as a so-called monocular camera; however, they may be either of a stereo camera and a monocular camera. The vehicle 1 may include, besides the front imaging cameras 31LF and 31RF and the rear imaging camera 31R, cameras provided at side-view mirrors 11L and 11R to respectively image the left rear and the right rear.

The LiDAR 31S transmits optical waves, receives the reflected waves of the optical waves, and detects an object and a distance to the object on the basis of the time between transmission of the optical waves and reception of the reflected waves. The LiDAR 31S sends detection data to the drive assist apparatus 50. The vehicle 1 may include, as a surrounding environment sensor for obtaining information on the surrounding environment, instead of the LiDAR 31S or in addition to the LiDAR 31S, one or more sensors among radar sensors such as millimeter wave radars, and ultrasonic sensors.

The road surface detection sensor 33 is configured by including one or more sensors for detecting the road friction state in front of the vehicle 1. For example, the road surface detection sensor 33 is configured as a composite sensor including multiple sensors among the front imaging cameras 31LF and 31RF, a non-contact temperature sensor, a near-infrared sensor, and a laser optical sensor (time of flight (ToF) sensor). The road surface detection sensor 33 sends detection signals to the drive assist apparatus 50. Detection signals of the front imaging cameras 31LF and 31RF are used as information for detecting the color of the road surface. A detection signal of the non-contact temperature sensor is used as information for detecting at least one of the outside air temperature or the road surface temperature. A detection signals of the near-infrared sensor is used as information for detecting the road surface moisture content. A detection signals of the laser optical sensor is used as information for detecting the roughness of the road surface.

The vehicle state sensor 35 includes one or more sensors for detecting the operation state and behavior of the vehicle 1. The vehicle state sensor 35 includes at least one of, for example, a steering angle sensor, an acceleration position sensor, a brake stroke sensor, a brake pressure sensor, or an engine speed sensor, and detects the operation state of the vehicle 1, such as the steering angle of the steering wheel 13 or the steered wheels, accelerator opening, brake operation amount, or engine speed. In addition, the vehicle state sensor 35 includes at least one of, for example, a vehicle speed sensor, an acceleration sensor, or an angular velocity sensor, and detects the behavior of the vehicle 1, such as the vehicle speed, longitudinal acceleration, lateral acceleration, or yaw rate. The vehicle state sensor 35 sends sensor signals including various items of detected information to the drive assist apparatus 50.

The navigation system 40 is a navigation system of the related art, which sets a drive route to a destination set by an occupant, and informs the driver of the drive route. The GPS sensor 37 is connected to the navigation system 40, and the navigation system 40 receives a satellite signal from a GPS satellite via the GPS sensor 37, and obtains position information of the vehicle 1 on map data. Instead of the GPS sensor 37, an antenna for receiving a satellite signal from another satellite system that identifies the position of the vehicle 1 may be used.

The HMI 43 is driven by the drive assist apparatus 50, and presents various information to the driver by means of image display, audio output, etc. The HMI 43 includes, for example, a display device provided in an instrumental panel, and a loudspeaker provided in the vehicle 1. The display device may have the function of the display device of the navigation system 40. The HMI 43 may also include a head-up display for displaying an image on the front window of the vehicle 1.

1-2. Drive Assist Apparatus

Next, the drive assist apparatus 50 according to the first embodiment of the disclosure will be concretely described.

1-2-1. Exemplary Configuration

Figure 2:
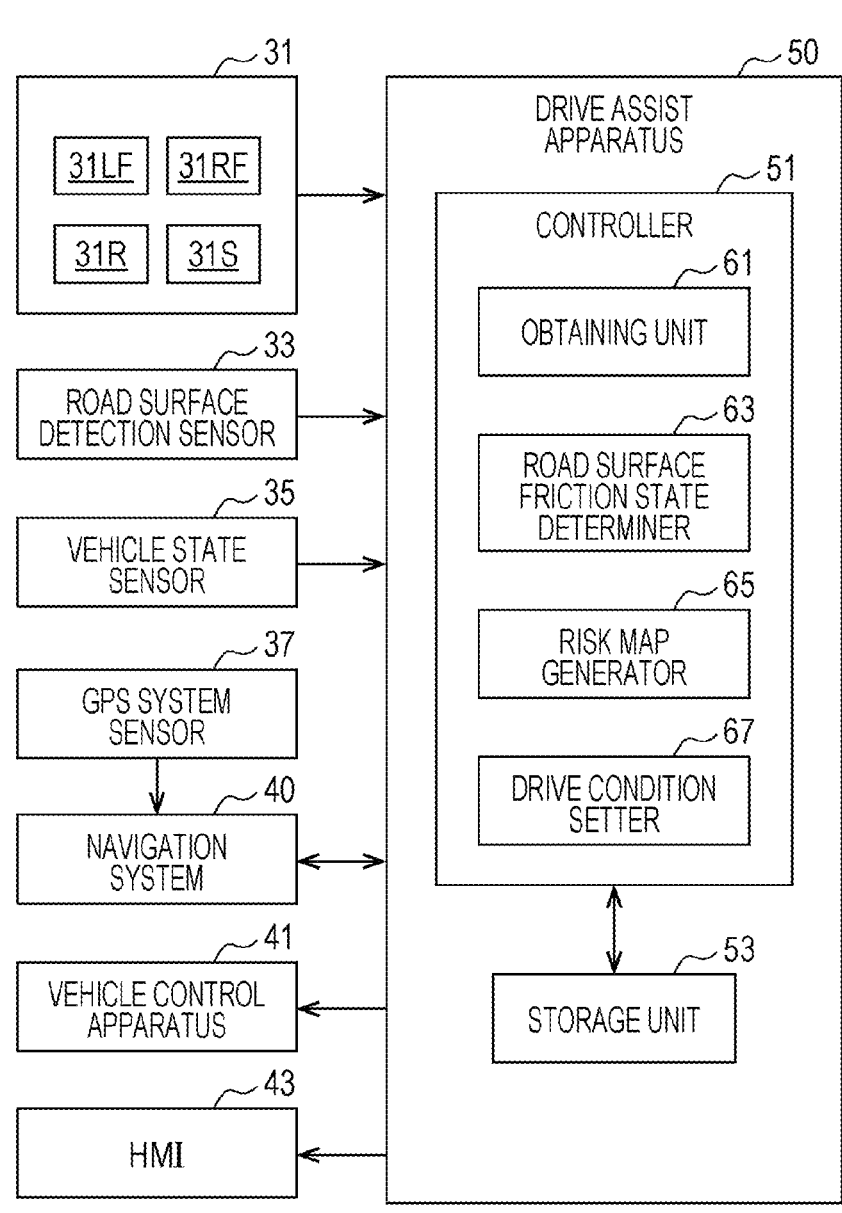
FIG. 2 is a block diagram illustrating an exemplary configuration of the drive assist apparatus according to the first embodiment.

FIG. 2 is a block diagram illustrating an exemplary configuration of the drive assist apparatus 50 according to the present embodiment.

A surrounding environment sensor 31, the road surface detection sensor 33, and the vehicle state sensor 35 are connected to the drive assist apparatus 50 via communication means such as dedicated lines, controller area network (CAN), or local internet (LIN). In addition, the navigation system 40, the vehicle control apparatus 41, and the HMI 43 are connected to the drive assist apparatus 50 via communication means such as dedicated lines, CAN, or LIN. Note that the drive assist apparatus 50 is not limited to an ECU mounted in the vehicle 1, and may be a terminal apparatus such as a smartphone or a wearable device.

The drive assist apparatus 50 includes a controller 51 and a storage unit 53. The controller 51 is configured by including a processor such as one or more central processing units (CPUs). The controller 51 may be partially or entirely formed of one that is updatable, such as firmware, or may be a program module executed in response to a command from the CPU or the like. The storage unit 53 includes memory such as random-access memory (RAM) or read-only memory (ROM). Note that the number and type of the storage unit 53 are not particularly limited. The storage unit 53 records information such as computer programs executed by the controller 51, various parameters used for calculations, detection data, and calculation results.

1-2-2. Functional Configuration

As illustrated in FIG. 2, the controller 51 of the drive assist apparatus 50 includes an obtaining unit 61, a road surface friction state determiner 63, a risk map generator 65, and a drive condition setter 67. These units are functions realized by executing computer programs by a processor such as a CPU, and some or all of these units may be configured using an analog circuit. Hereinafter, the functions of the units of the controller 51 will be briefly described, and then the processing operation of the controller 51 will be concretely described.

Obtaining Unit

The obtaining unit 61 executes a process of obtaining various information regarding the vehicle 1. In one example, the obtaining unit 61 obtains information on the drive state of the vehicle 1 and information on the surrounding environment of the vehicle 1 every certain calculation cycle, and records these items of information in the storage unit 53. Information on the drive state of the vehicle 1 includes information on the operation state of the vehicle 1, such as the steering angle of the steering wheel 13 or the steered wheels, accelerator opening, brake operation amount, or engine speed, and information on the behavior of the vehicle 1, such as the vehicle speed, longitudinal acceleration, lateral acceleration, or yaw rate, which are detected by the vehicle state sensor 35.

Information on the surrounding environment of the vehicle 1 includes information on the type, size (width, height, and depth), and position of a risk object present around the vehicle 1, the distance from the vehicle 1 to the risk object, and the relative speed of the risk object with respect to the vehicle 1, which are detected by the surrounding environment sensor 31. Risk objects include any objects that are present around the vehicle 1 and that may have a risk of collision with the vehicle 1, such as other driven vehicles, parked vehicles, pedestrians, bicycles, side walls, curbs, guardrails, buildings, utility poles, traffic signs, traffic signals, natural objects, etc. In addition, information on the surrounding environment of the vehicle 1 may include information on boundaries on the road.

Information on the surrounding environment of the vehicle 1 also includes information regarding the friction state of the road surface in the direction of travel of the vehicle 1, which is detected by the road surface detection sensor 33. Information regarding the friction state of the road surface includes one or more items of information among the following: the color of the road surface, the outside air temperature or the road surface temperature, the road surface moisture content, and the road surface roughness, which are detected by the front imaging cameras 31LF and 31RF and the road surface detection sensor 33.

Road Surface Friction State Determiner

The road surface friction state determiner 63 executes a process of determining the road surface friction state in the direction of travel of the vehicle 1 on the basis of information on the friction state of the road surface, which is obtained by the obtaining unit 61. The road surface friction state determiner 63 determines the road surface friction state in each area of the road surface in the direction of travel of the vehicle 1. The road surface friction state is distinguished as, for example, "dry", "wet", "snow", or "ice". The road surface friction state determiner 63 may distinguish the road surface friction state in each preset section, or may generate a road surface friction state map. In one example, the road surface friction state determiner 63 not only distinguishes the entire area of the road surface in the direction of travel of the vehicle 1 as "dry", "wet", "snow" or "ice", but also distinguishes, for example, in the case where a puddle, frozen area, or snow remains in part of the road surface, that area as "wet", "snow", or "ice", as well as distinguishing the other areas as "dry". In addition, the road surface friction state determiner 63 may further estimate the road surface material in the case where the road surface friction state is determined as "dry". The road surface material is distinguished as, for example, "asphalt", "concrete", or "gravel".

Risk Map Generator

In autonomous drive of the vehicle 1, the risk map generator 65 executes a process of generating a risk map on the basis of information on a basic risk potential of a risk object present around the vehicle 1, and information on an external environmental factor that may cause deviation of the drive track of the vehicle 1. In the present embodiment, a risk map is generated as information on an external environmental factor on the basis of information on the road surface friction state in the direction of travel of the vehicle 1. In one example, the risk map generator 65 sets a basic risk potential to each risk object present around the vehicle 1. In addition, the risk map generator 65 predicts deviation of the drive track of the vehicle 1 in the case where the state of the road surface in the direction of travel is "wet", "snow", or "ice", and performs correction to expand the setting range of the risk potential of a risk object positioned in the direction of the expected deviation. By adding the spatial overlap of the risk potential of each risk object, the risk map generator 65 obtains a risk map (potential field) representing the risk of collision with a plurality of risk objects.

Drive Condition Setter

In autonomous drive of the vehicle 1, the drive condition setter 67 sets drive conditions of the vehicle 1 on the basis of information on a risk map generated by the risk map generator 65. In one example, in autonomous drive of the vehicle 1, the drive condition setter 67 sets the drive track with the minimum risk value as a target track of the vehicle 1. In the present embodiment, the drive condition setter 67 sets a target vehicle speed of the vehicle 1 so that the risk value will be less than or equal to a certain risk threshold. The drive condition setter 67 sets a target steering angle and a target acceleration/deceleration speed on the basis of information on the set target track and target vehicle speed, and sends these items of information to the vehicle control apparatus 41. Having received information on the drive conditions, the vehicle control apparatus 41 controls driving of each control unit on the basis of information on the set drive conditions.

1-3. Process of Setting Drive Conditions Based on Risk Potentials 1-3-1. Overview of Risk Potentials Before describing the specific processing of the drive assist apparatus 50, the overview of a process of setting drive conditions based on risk potentials, which is executed by the drive assist apparatus 50, will be briefly described.

Figure 3:
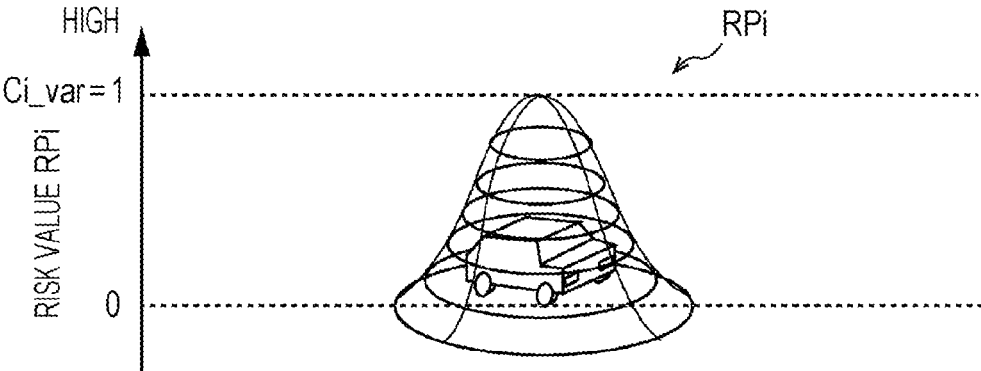
FIG. 3 is an explanatory diagram illustrating an example of a risk potential set to a risk object.

FIG. 3 is an explanatory diagram illustrating a risk potential set to each risk object. In FIG. 3, an exemplary risk potential set to a vehicle is illustrated. The value (risk value) $RP_i$ of a risk potential at each coordinate position (x, y) in a two-dimensional coordinate system with a preset reference position of the vehicle 1 as the center of gravity (x, y=0, 0) is the maximum value at a preset reference position $(x_0, y_0)$ of a risk object (vehicle), and decreases as the distance from the reference position increases. The reference position may be, for example, the position of the center of gravity in the case where the vehicle 1 or risk object is overviewed. The risk value $RP_i$ may be expressed as an exponential function with respect to the distance from the reference position, and is expressed by, for example, Equation (1) below:

$$RP_i = C_{i-}\text{var} \cdot \exp\left\{-\frac{(x-x_0)^2}{\sigma_i \cdot R^2} - \frac{(y-y_0)^2}{\sigma_i \cdot R^2}\right\} \tag{1}$$

$RP_i$: risk value;
$C_{i-}$var: gain;
$\sigma_i$: slope coefficient;
R: coefficient representing the road surface state;
$x_0, y_0$: coordinates of the reference position of the risk object; and
i: numbering to distinguish the risk object.

For example, the maximum value of the risk value $RP_i$ is set to "1", and the risk value $RP_i$ at each coordinate position is defined within the range from "0" to "1". Note that the maximum value of the risk value $RP_i$ may be set to each risk object as a value dependent on the type of the risk object. For example, in the case where the risk object is a "vehicle" or a "short curb", it is regarded that the risk of collision with the vehicle is higher than the risk of collision with the short curb, and the maximum value of the risk value $RP_i$ set to the "vehicle" is set to a value greater than the maximum value of the risk value $RP_i$ set to the "short curb".

The gain $C_{i\_}$var is a weight value set in accordance with the correlation between the vehicle 1 and the risk object, and defines the maximum value of the risk value $RP_i$. In the case where the maximum value of the risk value $RP_i$ is set to "1", the gain $C_{i\_}$var is set within the range from "0" to "1". The gain $C_{i\_}$var is calculated using, for example, either one or both of the reciprocal of the shortest distance between the vehicle 1 and the risk object, and the relative speed of the risk object with respect to the vehicle 1. The shorter the shortest distance or the greater the relative speed, the greater the value of the gain $C_{i\_}$var.

The slope coefficient $\sigma_i$ is a coefficient that defines the rate of decrease in risk potential with respect to the distance from the reference position of the risk object. The slope coefficient $\sigma_i$ may be adjusted according to the type of the risk object. In addition, in the case where the risk object is a moving object such as a vehicle, the risk in the direction of travel of the moving object is higher. Thus, the setting range of the risk value $RP_i$ ahead of the moving object may be set to be wider than the setting range of the risk value $RP_i$ behind the moving object. In this case, the depth of the risk value $RP_i$ ahead may be changeable according to the speed of the moving object or the relative speed of the moving object with respect to the vehicle 1.

The coefficient R representing the road surface state is a coefficient used for expanding the setting range of the risk potential of a risk object positioned in the direction of deviation of the drive track of the vehicle 1, and is set as the reciprocal of a road surface friction coefficient μ in accordance with the road surface friction state. The road surface friction coefficient μ is set within the range from "0" to "1" in accordance with the road surface friction state determined by the road surface friction state determiner 63. The coefficient R representing the road surface state is a larger value as the road surface coefficient μ is smaller, that is, as the road surface is more slippery, and the setting range of the risk potential is expanded. The coefficient R representing the road surface state of the risk potential of a risk object other than a risk object positioned in the direction of deviation of the drive track of the vehicle 1 is set to "1", and the coefficient R representing the road surface state of the risk potential of a risk object positioned in the direction of deviation of the drive track of the vehicle 1 is changeable in accordance with the road surface friction coefficient μ.

In the case of setting drive conditions of the vehicle 1 using risk potentials, a risk potential is set to each risk object detected while the vehicle 1 is driving, and a risk map (potential field) representing the risks for a plurality of risk objects is obtained by adding the spatial overlap of each risk potential. At that time, instead of the sum of the risk value at each coordinate position calculated using a risk potential set to each risk object, any maximum risk value may be used as the risk value at the coordinate position.

In the risk map, the level of a risk is illustrated as a contour line on a two-dimensional plane. As mentioned above, since the risk value has a two-dimensional distribution, a track with a lower risk may be selected. Along with apparent risk objects, a risk map may be calculated by taking into consideration risks that are not apparent (latent risks). For example, in the case where the vehicle 1 passes an area where the road ahead of a turn is a blind spot due to a shield, a latent risk may be given assuming that a passerby or a vehicle may jump out of the blind spot area, and this may be reflected in the risk map.

In the drive assist apparatus 50 according to the present embodiment, a risk potential is set to each risk object using Equation (1) above. For a risk object positioned in the direction of deviation expected on the basis of information on the road surface friction state that may cause deviation of the drive track of the vehicle 1, the road surface friction state is reflected in the risk potential, and the setting range of the risk potential is expanded. Accordingly, the to-be-set target track is more easily set to a position distant from the risk object, and optimal drive conditions that take into consideration the deviation of the drive track may be set.

1-3-2. Specific Example of Risk Potential

Next, a specific example of a risk potential set by the drive assist apparatus 50 according to the present embodiment will be described.

Figure 4:
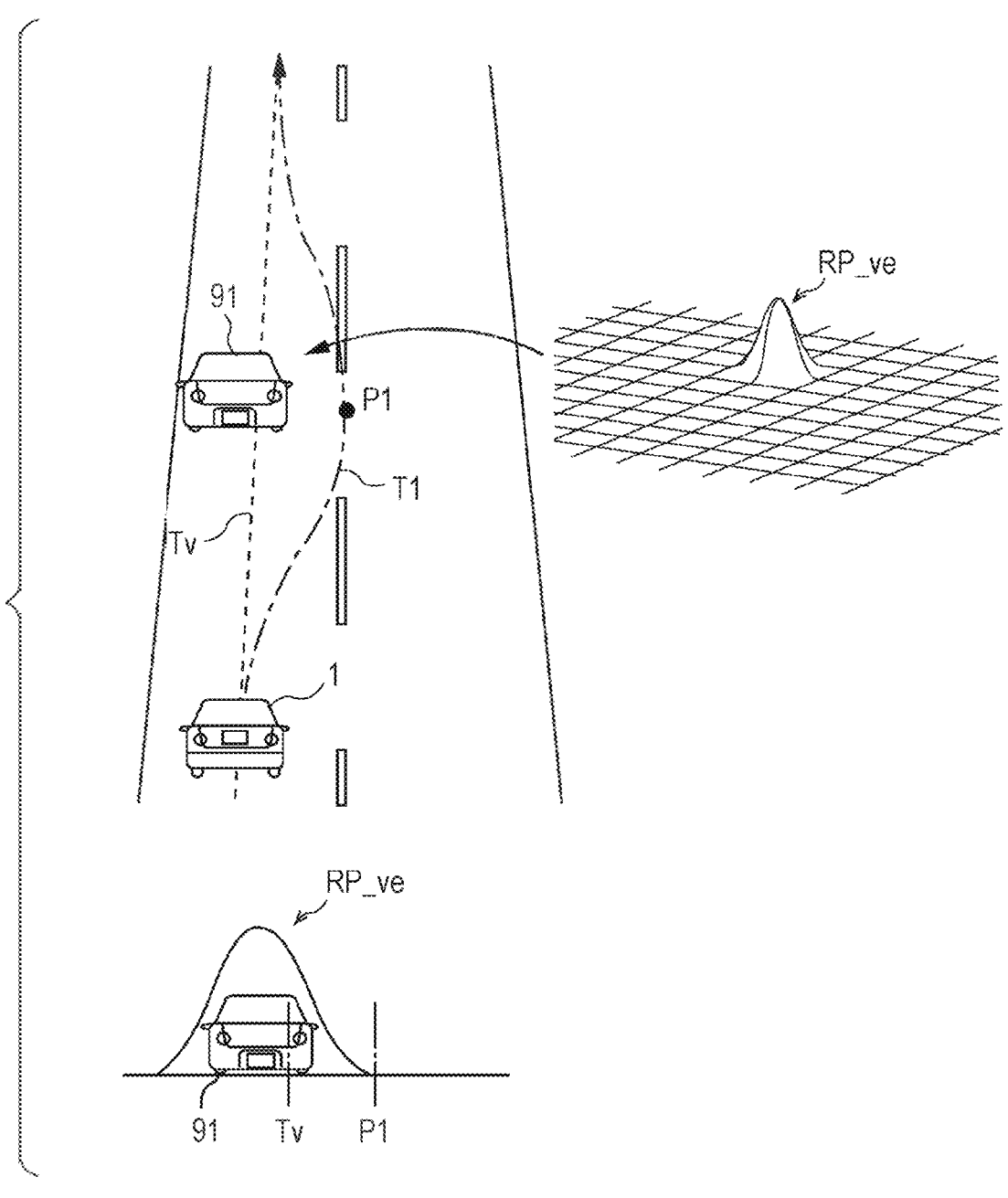
FIG. 4 is an explanatory diagram illustrating an example of a target track set on the basis of a basic risk potential.
Figure 5:
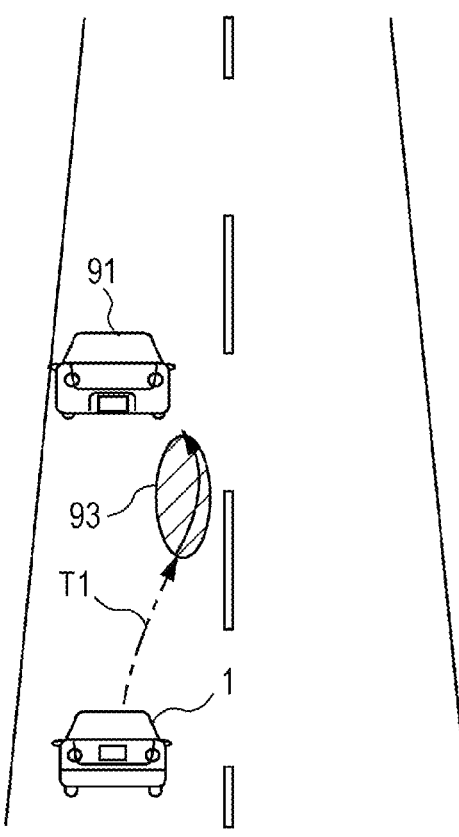
FIG. 5 is an explanatory diagram illustrating deviation of a drive track due to a low friction area.
Figure 6:
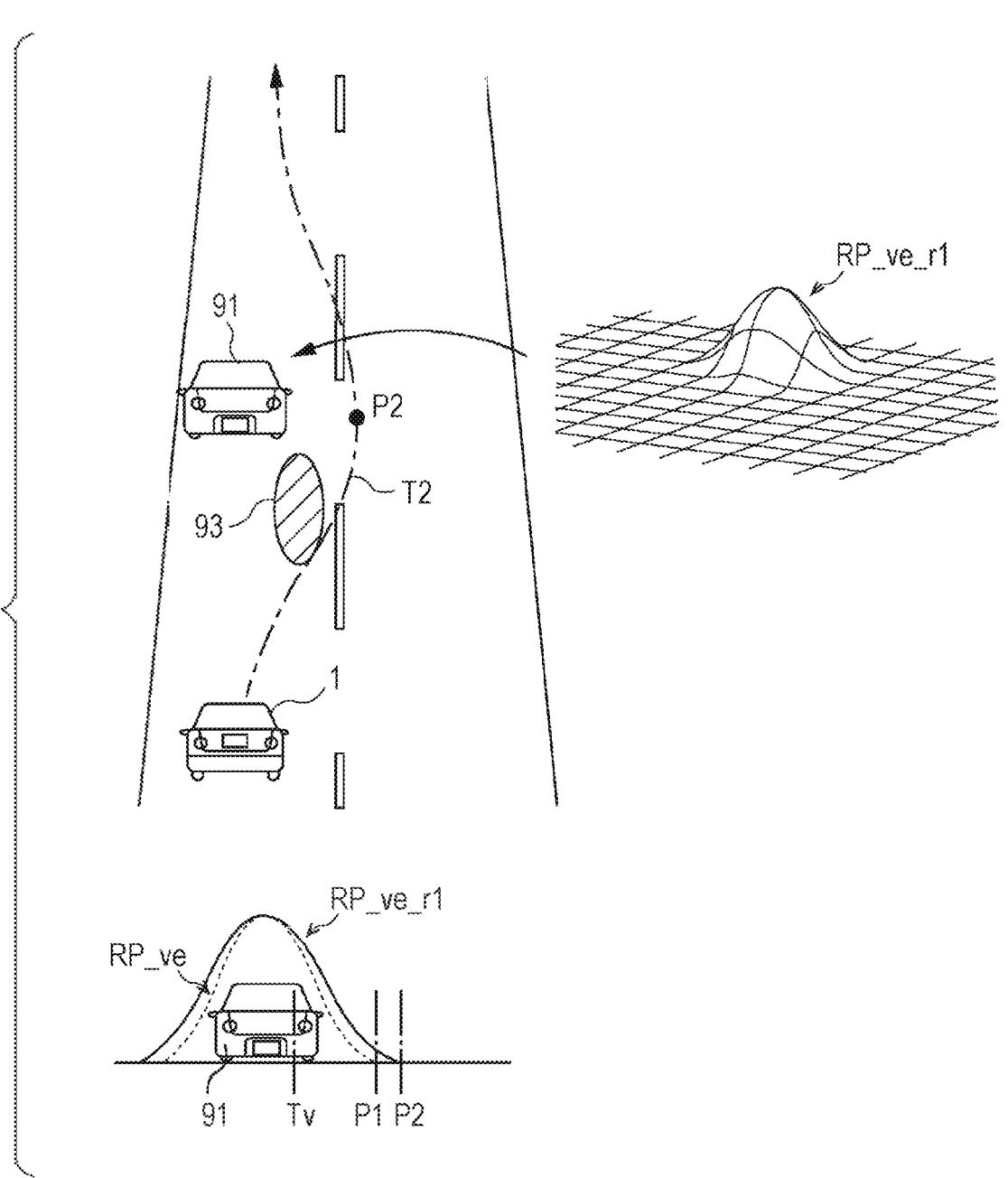
FIG. 6 is an explanatory diagram illustrating an example of a risk potential and a target track set by the drive assist apparatus of the first embodiment.

FIGS. 4 to 6 illustrate setting examples of a risk potential and a target track set in a scene where the vehicle 1 passes by the side of another vehicle (stopped vehicle) 91, which is stopped at the road edge ahead in the direction of travel of the vehicle 1.

FIG. 4 illustrates an example in the case where the road surface is ideally dry. The ideally dry road surface is, for example, a dry asphalt road surface. If there is no risk object, the target track is basically set to, for example, a reference path Tv (see a broken line in FIG. 4) set in the center of a lane. In response to detection of the stopped vehicle 91 ahead in the direction of travel of the vehicle 1, the risk map generator 65 sets a risk potential RP_ve to the stopped vehicle 91 using Equation (1) above. At this time, because there is no area between the vehicle 1 and the stopped vehicle 91 where the road surface friction coefficient μ is small, the coefficient R representing the road surface state in Equation (1) above is set to 1, and the risk potential RP_ve is set. The drive condition setter 67 sets a target track T1 so that the vehicle 1 will pass a position P1 where the risk value is the smallest in order to avoid collision with the stopped vehicle 91. For example, the drive condition setter 67 sets the target track T1 passing the above-mentioned position P1 so that the steering angular velocity will not exceed a preset threshold.

FIGS. 5 and 6 illustrate an example in the case where there is a frozen portion (hereinafter may also be referred to as an "ice area") 93 in part of the road surface between the vehicle 1 and the stopped vehicle 91. The "ice area" 93 may occur in the case where, for example, a puddle on the road surface freezes. In the case where the road surface state of part of the road surface ahead in the direction of travel of the vehicle 1 is distinguished as "ice", the risk map generator 65 predicts the direction of deviation of the drive track due to this "ice area" 93. In the case where the vehicle 1 drives on the target track T1 illustrated in FIG. 4 described above, as illustrated in FIG. 5, it is predicted that the wheels of the vehicle 1 will pass over the "ice area" 93 immediately before passing by the side of the stopped vehicle 91, and, due to the slippage of the wheels, the vehicle 1 will head toward the stopped vehicle 91.

When setting the risk potential RP_ve of the stopped vehicle 91, which is present in the direction of deviation of the drive track, the risk map generator 65 sets the coefficient R representing the road surface state in Equation (1) above in accordance with the road surface friction coefficient μ, and sets a risk potential RP_ve_r1. Accordingly, as illustrated in FIG. 6, the setting range of the risk potential RP_ve_r1 is expanded as compared with the setting range of the risk potential RP_ve. As a result, a target track T2 is set so as to pass a position P2, which is more distant from the stopped vehicle 91 than the position P1 illustrated in FIG. 4.

Figure 7:
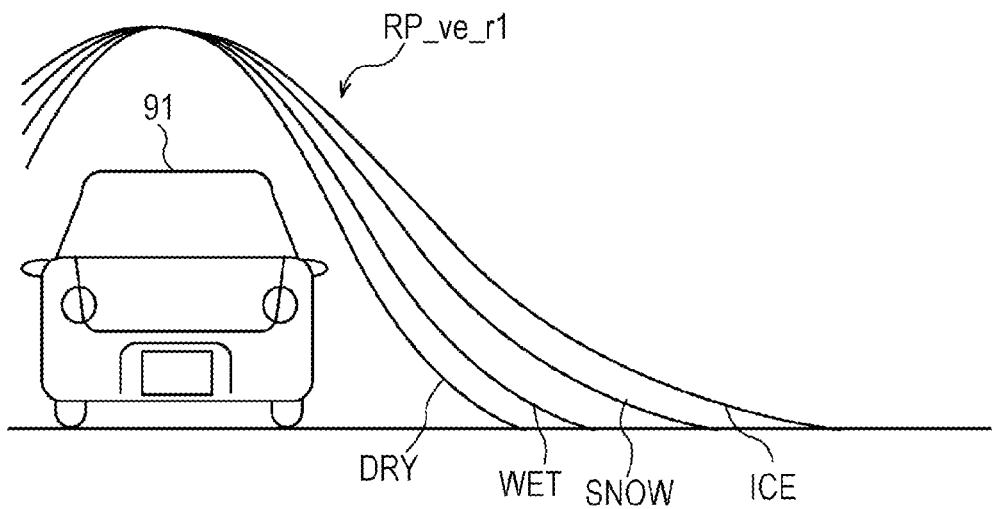
FIG. 7 is an explanatory diagram illustrating a risk potential set in accordance with a road surface state.

In Equation (1) above, it is set that a slope that defines the rate of decrease in risk potential with respect to the distance from the coordinates $x_0$, $y_0$ of the reference position of the risk object be dependent on the square of the coefficient R representing the road surface state (the reciprocal of the road surface friction coefficient $\mu$). For this reason, the smaller the road surface friction coefficient $\mu$, the gentler the slope, and the setting range of the risk potential $RP_i$ is expanded. In one example, as illustrated in FIG. 7, the setting range of the risk potential $RP\_ve\_r1$ set to the stopped vehicle 91 reflecting the road surface state is expanded in the order of the road surface states "dry", "wet", "snow", and "ice". Therefore, the target track is set so as to pass a position more distant from the stopped vehicle 91 as the road surface is more slippery, thereby reducing the risk of collision with the stopped vehicle 91.

1-4. Operation of Drive Assist Apparatus

Next, an exemplary operation of the drive assist apparatus 50 according to the present embodiment will be concretely described.

Figure 8:
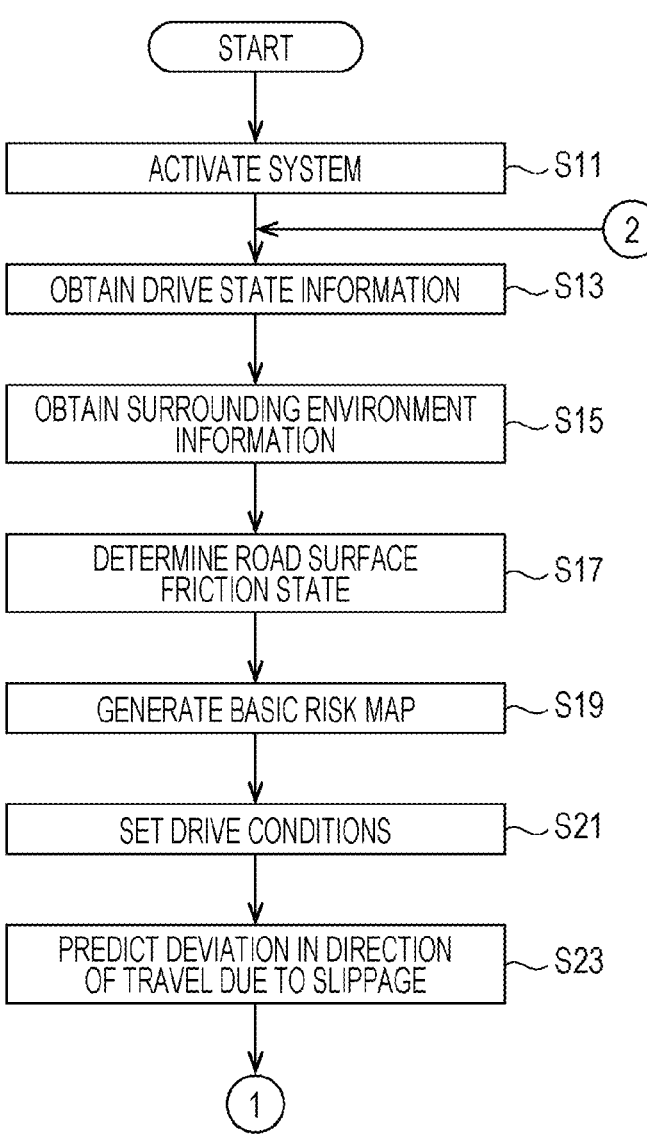
FIG. 8 is a flowchart illustrating a processing operation of the drive assist apparatus of the first embodiment.

FIGS. 8 and 9 are flowcharts illustrating an example of the processing operation of the drive assist apparatus 50.

At first, in response to activation of an on-board system including the drive assist apparatus 50 (step S11), the obtaining unit 61 obtains information on the drive state of the vehicle 1 (step S13). In one example, on the basis of detection signals sent from the vehicle state sensor 35, the obtaining unit 61 obtains information on the operation state of the vehicle 1, such as the steering angle of the steering wheel 13 or the steered wheels, accelerator opening, brake operation amount, or engine speed, and information on the behavior of the vehicle 1, such as the vehicle speed, longitudinal acceleration, lateral acceleration, or yaw rate.

Next, the obtaining unit 61 obtains information on the surrounding environment of the vehicle 1 (step S15). In one example, on the basis of detection signals sent from the surrounding environment sensor 31, the obtaining unit 61 obtains information on the type, size (width, height, and depth), and position of a risk object present around the vehicle 1, the distance from the vehicle 1 to the risk object, and the relative speed of the risk object with respect to the vehicle 1. In addition, the obtaining unit 61 may also obtain information on boundaries on the road on the basis of detection signals sent from the surrounding environment sensor 31. Note that the obtaining unit 61 may obtain one or more items of information among the above-mentioned items of information on the surrounding environment from an external device through vehicle-to-vehicle communication, roadside-vehicle communication, or mobile communication.

In addition, on the basis of detection signals sent from the surrounding environment sensor 31 and the road surface detection sensor 33, the obtaining unit 61 obtains information regarding the friction state of the road surface in the direction of travel of the vehicle 1. In one example, the obtaining unit 61 obtains information on the color of the road surface in the direction of travel of the vehicle 1 on the basis of detection signals sent from the front imaging cameras 31LF and 31RF. In addition, the obtaining unit 61 obtains information on the outside air temperature or the road surface temperature on the basis of a detection signal sent from the non-contact temperature sensor included in the road surface detection sensor 33. In addition, the obtaining unit 61 obtains information on the moisture content of the road surface on the basis of a detection signal of the near-infrared sensor included in the road surface detection sensor 33. In one example, in response to emission of near-infrared rays onto the road surface, the amount of reflection of the near-infrared rays is smaller if there is more moisture on the road surface, and is larger if there is less moisture on the road surface. Therefore, the obtaining unit 61 may obtain the moisture content of the road surface on the basis of a detection signal of the near-infrared sensor. In addition, the obtaining unit 61 obtains information on the roughness of the road surface on the basis of a detection signal of the laser optical sensor included in the road surface detection sensor 33. In one example, the obtaining unit 61 obtains information on the roughness of the road surface ahead of the vehicle 1 on the basis of the time from emission of laser light to detection of the reflected light thereof. Information regarding the friction state of the road surface, which is obtained on the basis of detection signals sent from the front imaging cameras 31LF and 31RF and the road surface detection sensor 33, is associated with information on the relative position defined by the direction, distance, etc. viewed from the vehicle 1.

Next, the road surface friction state determiner 63 determines the road surface friction state in the direction of travel of the vehicle 1 on the basis of information regarding the friction state of the road surface, which is obtained by the obtaining unit 61 (step S17). For example, the road surface friction state determiner 63 distinguishes the road surface state as "dry", "wet", "snow", or "ice" on the basis of information regarding the friction state of the road surface. For example, the road surface friction state determiner 63 may distinguish the road surface state using a three-dimensional map of the related art whose parameters are normalized values of the road surface temperature or the outside air temperature, the roughness of the road surface, and the road surface moisture content.

In addition, in the case where the road surface state is determined as "dry", the road surface friction state determiner 63 compares image data sent from the front imaging cameras 31LF and 31RF with pre-recorded image data of "asphalt", "concrete", and "gravel" to obtain the degree of similarity therebetween, and determines the material of the road surface. Image data of "asphalt", which is a comparison target, may be subdivided into image data of "new pavement", "normal pavement", "pavement wear" and "excess tar". Image data of "concrete", which is a comparison target, may be subdivided into image data of "new pavement", "normal pavement", and "pavement wear". Image data of "gravel", which is a comparison target, may be subdivided into image data of "simple pavement" and "fine gravel". Even in the case where the road surface state is determined as "snow" or "ice", the road surface friction state determiner 63 may perform matching processing based on the obtained image data, and may determine the subdivided road surface state. The distinction of the road surface may be performed using a machine-trained learning model.

The road surface friction state determiner 63 reflects the distinguished road surface state in a database in which the relationship between the road surface state and the road surface friction coefficient $\mu$ is set in advance, and calculates the road surface friction coefficient $\mu$. For example, the database of the road surface friction coefficient $\mu$ may be one in which the road surface friction coefficient $\mu$ is set in advance in accordance with the item of each of the subdivided road surface states.

As described above, information regarding the friction state of the road surface is respectively associated with information on the relative position with respect to the vehicle 1, and the road surface friction state determiner 63 divides the road surface ahead in the direction of travel of the vehicle 1 into areas according to the road surface state or the road surface friction coefficient μ. For example, the road surface friction state determiner 63 sets areas, such as "dry area", "wet area", "snow area", and "ice area", depending on each road surface state or road surface friction coefficient μ. Further subdivided area setting may be performed.

Next, the risk map generator 65 generates a basic risk map on the basis of information on the surrounding environment, which is obtained by the obtaining unit 61 (step S19). In one example, the risk map generator 65 generates the basic risk map (potential field) representing the risks for a plurality of risk objects by setting a risk potential to each of detected risk objects using Equation (1) above, and adding the spatial overlap of each risk potential (see FIG. 4). In step S19, the risk potential is set by having the coefficient R representing the road surface state as "1" irrespective of the road surface state, and the basic risk map is generated.

Next, the drive condition setter 67 sets drive conditions of the vehicle 1 on the basis of the generated basic risk map and information on the drive state of the vehicle 1 (step S21). In one example, the drive condition setter 67 sets a target track and a target vehicle speed so that the vehicle 1 will pass a position with the lowest risk value on the basis of, for example, information on a reference path set in the center of the lane and the generated basic risk map. At that time, the drive condition setter 67 may set a target track so that the steering angular velocity will not exceed a preset threshold on the basis of information on the current direction of travel, steering angle, vehicle speed, and acceleration/deceleration speed of the vehicle 1.

Next, the drive condition setter 67 predicts deviation in the direction of travel due to slippage in the case where the vehicle 1 drives along the target track, on the basis of information on the road surface state and the road surface friction coefficient μ calculated by the road surface friction state determiner 63 (step S23). For example, the drive condition setter 67 determines whether the vehicle 1 passes a "wet area", "snow area", or "ice area" in the case where the vehicle 1 drives along the set target track, and predicts deviation in the direction of travel of the vehicle 1 (see FIG. 5). For example, the drive condition setter 67 determines which of the wheels of the vehicle 1 will pass over a "wet area", "snow area", or "ice area", and, on the basis of information on the steering angle, vehicle speed, and acceleration/deceleration speed in the case where the wheel(s) pass(es) over the "wet area", "snow area", or "ice area", predicts the probability of slippage of the vehicle 1 and deviation in the direction of travel due to the slippage. At this time, slippage may be predicted using the road surface friction coefficient μ of each of the "wet area", "snow area", and "ice area". In addition, if the function of estimating the wear state of the tires of the vehicle 1 is provided, slippage may be predicted using this wear state.

Next, the drive condition setter 67 determines whether there is a risk object in the direction of deviation in the direction of travel of the vehicle 1 (step S25). For example, in the case where the vehicle 1 moves in the direction of predicted deviation in the direction of travel, the drive condition setter 67 determines whether there is a risk object that overlaps the direction of travel of the vehicle 1.

In the case where there is no risk object in the direction of deviation in the direction of travel of the vehicle 1 (S25/No), the drive condition setter 67 proceeds to step S31 as it is, sets a target steering angle and a target acceleration/deceleration speed on the basis of information on the target track and the target vehicle speed set in step S21, and sends these items of information to the vehicle control apparatus 41 (step S31).

In contrast, in the case where there is a risk object in the direction of deviation in the direction of travel of the vehicle 1 (S25/Yes), the risk map generator 65 performs correction to expand the setting range of the risk potential of the risk object present in the direction of deviation in the direction of travel (step S27). In one example, the risk map generator 65 sets the coefficient R representing the road surface state of the risk potential of the relevant risk object on the basis of the road surface friction coefficient μ of the "wet area", "snow area", or "ice area", which may cause deviation in the direction of travel of the vehicle 1. Using the set coefficient R representing the road surface state, the risk map generator 65 sets the risk potential of the risk object using Equation (1) above. Accordingly, at least the setting range of the risk potential may be expanded (see FIG. 6).

Next, the drive condition setter 67 sets drive conditions of the vehicle 1 on the basis of the risk map reflecting the corrected risk potential and information on the drive state of the vehicle 1 (step S29). In one example, the drive condition setter 67 sets a target track and a target vehicle speed so that the vehicle 1 will pass a position with the lowest risk value according to the processing in step S21. The to-be-set target track is set so as to pass a position more distant from the risk object, as compared with the target track set in step S21.

Next, the drive condition setter 67 sets a target steering angle and a target acceleration/deceleration speed on the basis of information on the set target track and target vehicle speed, and sends these items of information to the vehicle control apparatus 41 (step S31).

Next, the drive condition setter 67 determines whether the on-board system has stopped (step S33). In the case where the on-board system has stopped (S33/Yes), the process executed by the controller 51 ends. In contrast, in the case where the on-board system has not stopped (S33/No), the process returns to step S13, and the processing in each of the steps described so far is repeatedly executed.

As described above, in the case where there is a low friction area where the road surface friction coefficient μ is small ahead in the direction of travel of the vehicle 1, the drive assist apparatus 50 according to the first embodiment of the disclosure predicts deviation in the direction of travel of the vehicle 1 due to the low friction area. In addition, in the case where there is a risk object in the direction of deviation in the direction of travel of the vehicle 1, the drive assist apparatus 50 expands the setting range of the risk potential of the risk object. Accordingly, the target track (T2) is set so as to pass a position more distant from the risk object, as compared with the target track (T1) set on the basis of the risk potential before the expansion. Therefore, even in the case where the vehicle 1 slips due to the low friction area, the risk of collision with the risk object may be reduced.

In addition, the drive assist apparatus 50 according to the present embodiment sets the risk potential of the risk object using Equation (1) above in which the road surface friction coefficient μ is reflected in the slope of the risk potential. For this reason, the setting range of the risk potential is expanded in accordance with the road surface state of the low friction area, and a difference in target track before and after the correction may be prevented from becoming excessively large.

2. Second Embodiment

Next, a drive assist apparatus according to a second embodiment of the disclosure will be described.

In the drive assist apparatus according to the second embodiment, in addition to expansion of the setting range of the risk potential of a risk object present in the direction of deviation in the direction of travel of the vehicle 1, a risk map is corrected in accordance with the state of the road surface in the direction of travel. In one example, in the case where the road surface friction coefficient of a partial area of the road surface in the direction of travel of the vehicle 1 is smaller than the road surface friction coefficient of the surroundings, a risk potential is also set to the road surface of the partial area. In addition, in the case where the road surface friction coefficient of the entire road surface in the direction of travel of the vehicle 1 is smaller than the road surface friction coefficient of a dry road surface, the value of the risk potential of a risk object present in the direction of deviation in the direction of travel is increased.

The drive assist apparatus according to the present embodiment has a configuration that is the same as or similar to the exemplary configuration of the drive assist apparatus 50 according to the first embodiment illustrated in FIG. 2. Hereinafter, points of the specific processing of the drive assist apparatus 50 according to the present embodiment that are different from the first embodiment will be mainly described.

2-1. Specific Example of Risk Potential

Figure 10:
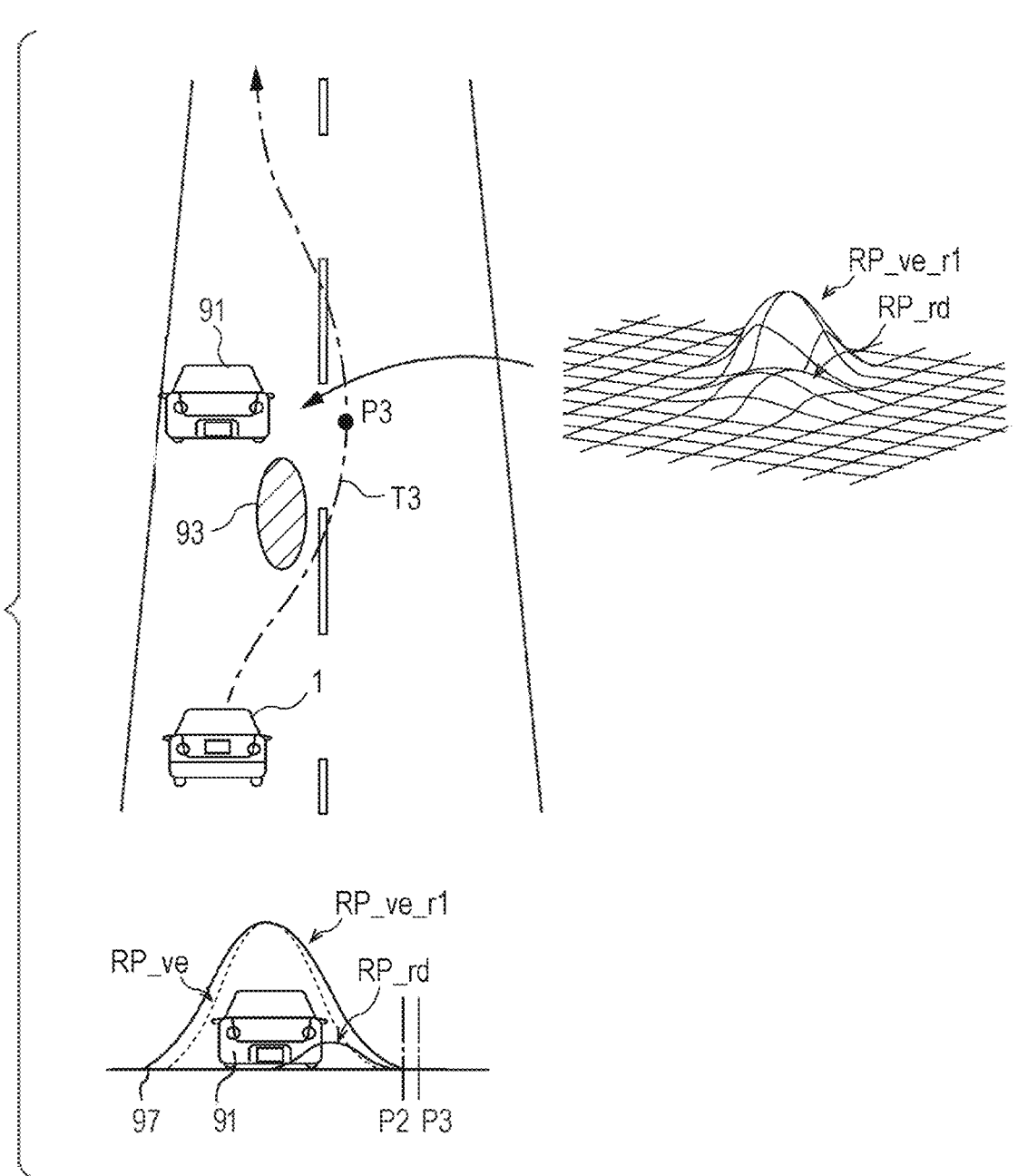
FIG. 10 is an explanatory diagram illustrating an example of a risk potential and a target track set by a drive assist apparatus of a second embodiment.
Figure 11:
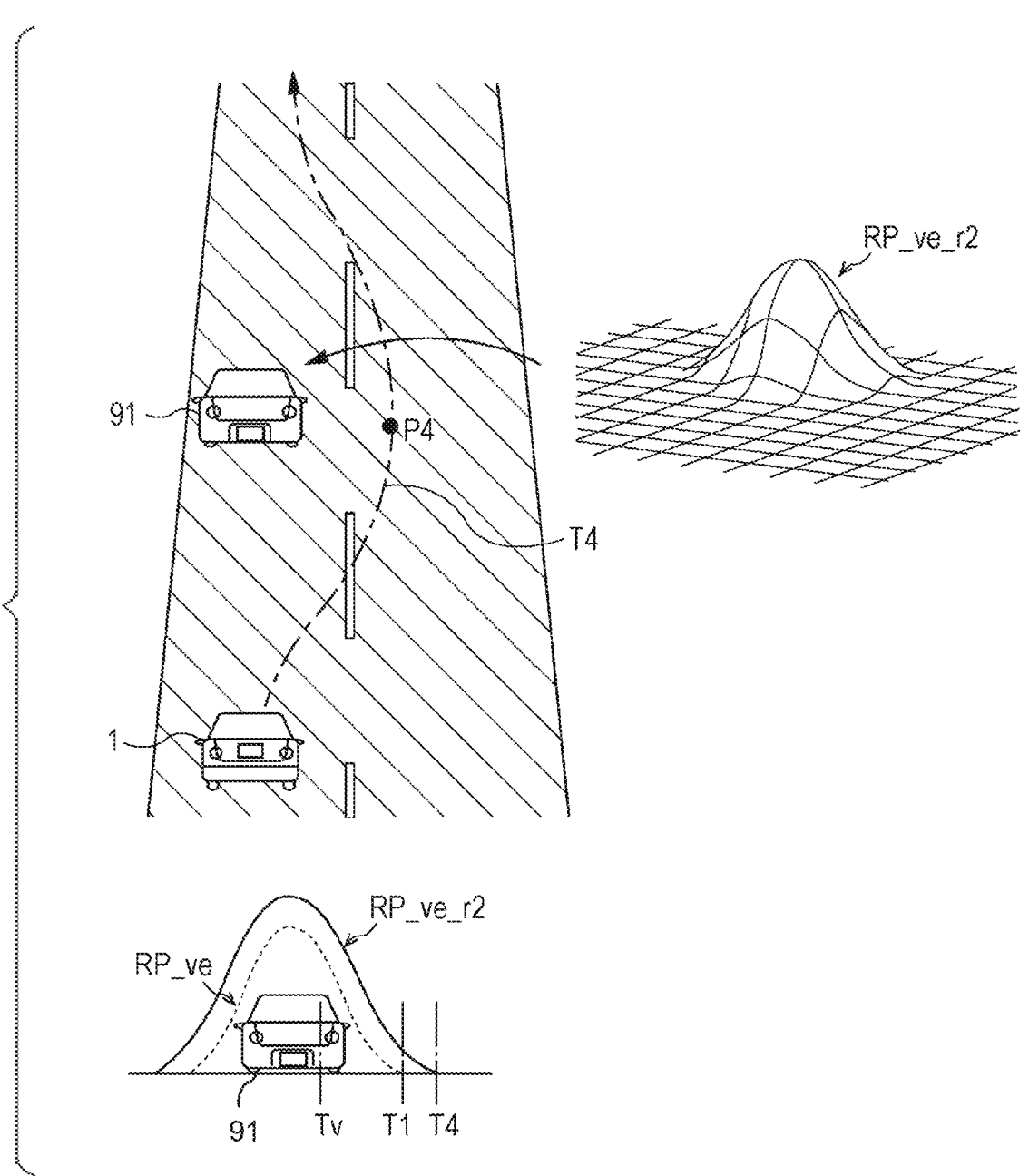
FIG. 11 is an explanatory diagram illustrating an example of a risk potential and a target track set by the drive assist apparatus of the second embodiment.

FIGS. 10 and 11 illustrate exemplary settings of a risk potential and a target track generated by the drive assist apparatus 50 according to the present embodiment. The exemplary settings of the risk potential and the target track illustrated in FIGS. 10 and 11 correspond to the exemplary setting in the scene illustrated in FIG. 4.

FIG. 10 illustrates, like the example illustrated in FIG. 6, an example in the case where there is the "ice area" 93 in part of the road surface between the vehicle 1 and the stopped vehicle 91. In this case, as illustrated in FIG. 5, it is predicted that the wheels of the vehicle 1 will pass over the "ice area" 93 immediately before passing by the side of the stopped vehicle 91, and, due to the slippage of the wheels, the vehicle 1 will head toward the stopped vehicle 91. For this reason, as illustrated in FIG. 6, the risk map generator 65 performs correction to expand the setting range of the risk potential RP_ve of the stopped vehicle 91, which is present in the direction of deviation of the drive track, and sets the corrected risk potential RP_ve_r1.

In addition, in the present embodiment, in the case where part of the road surface is distinguished as a "wet area", "snow area", or "ice area" (hereinafter may collectively be referred to as a "low friction area"), the risk map generator 65 sets the risk potential RP_rd to this "low friction area". As compared with the risk potential RP_$i$ of Equation (1) above, which is set to a risk object, the risk potential RP_rd set to a low friction area is expressed by, for example, Equation (2) below:

$$RP\_rd = v_0 \cdot \exp\left\{-\frac{(x - x_{0r})^2}{R^2} - \frac{(y - y_{0r})^2}{R^2}\right\} \qquad (2)$$

RP_rd: risk value of the low friction area;

$v_0$: coefficient representing the vehicle speed of the vehicle 1;

R: coefficient representing the road surface state; and $x_{0r}$, $y_{0r}$: coordinates of the low friction area.

The coefficient $v_0$ representing the vehicle speed of the vehicle 1 is standardized in reference to a preset criterion for the vehicle speed of the vehicle 1, and is defined within the range of "0" to "1". The higher the vehicle speed, the greater the value of the coefficient $v_0$ representing the vehicle speed of the vehicle 1. The coordinates $x_{0r}$, $y_{0r}$ of the low friction area may be, for example, the coordinates of a position in the low friction area where the road surface friction coefficient μ indicates the minimum value. Alternatively, the coordinates $x_{0r}$, $y_{0r}$ of the low friction area may be the position of the center of gravity in the case where the low friction area is overviewed.

Using Equation (2) above, the risk map generator 65 additionally sets the risk potential RP_rd to the road surface of an area where the road surface friction coefficient μ is smaller than the road surface friction coefficient μ of the surroundings. Accordingly, as illustrated in FIG. 10, a target track T3 is set so as to avoid the "ice area" 93, and the target track T3 is set so as to pass a position P3 more distant from the stopped vehicle 91 than the position P2 illustrated in FIG. 6. In addition, the probability that the wheels of the vehicle 1 will pass over the "ice area" 93 is reduced, thereby further decreasing the risk of collision with the stopped vehicle 91 due to the slippage.

In Equation (2) above, it is set that a slope that defines the rate of decrease in risk potential with respect to the distance from the coordinates $x_0$, $y_0$ of the low friction area be dependent on the square of the coefficient R representing the road surface state (reciprocal of the road surface friction coefficient μ). For this reason, the smaller the road surface friction coefficient μ, the gentler the slope, and the setting range of the risk potential RP_$i$ is expanded. Therefore, the target track is set so as to pass the position more distant from the coordinates $x_0$, $y_0$ of the low friction area as the low friction area is more slippery, thereby reducing the risk of slippage caused by the wheels' passing pass the low friction area.

FIG. 11 illustrates an example in the case where an "ice area" is formed on the entire road surface ahead in the direction of travel of the vehicle 1. In this case, no matter on which track the vehicle 1 drives, the vehicle 1 may collide with the stopped vehicle 91 due to the slippage of the wheels. For this reason, in the present embodiment, in the case where the road surface friction coefficient μ of the entire road surface ahead of the vehicle 1 is smaller than the road surface friction coefficient μ of a dry road surface, the risk map generator 65 increases the value of the risk potential of a risk object positioned in the direction of expected deviation. A risk potential RP_$i$ set to a risk object in the case where the road surface friction coefficient μ of the entire road surface ahead in the direction of travel of the vehicle 1 is small is expressed by, for example, Equation (3) below:

$$RP_i = R \cdot C_{i\_}var \cdot \exp\left\{-\frac{(x - x_0)^2}{\sigma_i \cdot R^3} - \frac{(y - y_0)^2}{\sigma_i \cdot R^3}\right\} \qquad (3)$$

RP_$i$: risk value;

$C_{i\_}$var: gain;

$\sigma_i$: slope coefficient;

R: coefficient representing the road surface state;

$x_0$, $y_0$: coordinates of the reference position of the risk object; and i: numbering to distinguish the risk object.

As compared with Equation (1) above, in Equation (3) above, the gain $C_{i\_}$var defining the maximum value of the risk value RP_$i$ is multiplied by the coefficient R representing the road surface state. The coefficient R representing the road surface state is a larger value as the road surface coefficient μ is smaller, that is, as the road surface is more slippery. Therefore, the smaller the road surface friction coefficient μ, the more the maximum value of the risk value $RP_i$ increases. In Equation (3) above, it is set that the slope coefficient $σ_i$, which defines the rate of decrease in risk potential with respect to the distance from the reference position of the risk object, be multiplied by the cube of the coefficient R representing the road surface state. For this reason, the smaller the road surface friction coefficient μ, the gentler the slope, and the setting range of the risk potential $RP_i$ is further expanded.

Therefore, as illustrated in FIG. 11, the set risk potential $RP_{i\_ve\_r2}$ is greater as a whole than the basic risk potential $RP_i$ illustrated in FIG. 4. Accordingly, a target track T4 is set so as to pass a position P4, which is yet more distant from the stopped vehicle 91 than the position P3 illustrated in FIG. 10. In addition, the target track is set so as to pass a position that is more distant from the stopped vehicle 91 as the road surface is more slippery. In doing so, the risk of collision with the stopped vehicle 91 may be further reduced in the case where the road surface friction coefficient μ of the entire road surface is small.

2-2. Operation of Drive Assist Apparatus

Next, an exemplary operation of the drive assist apparatus 50 according to the present embodiment will be concretely described.

Figure 12:
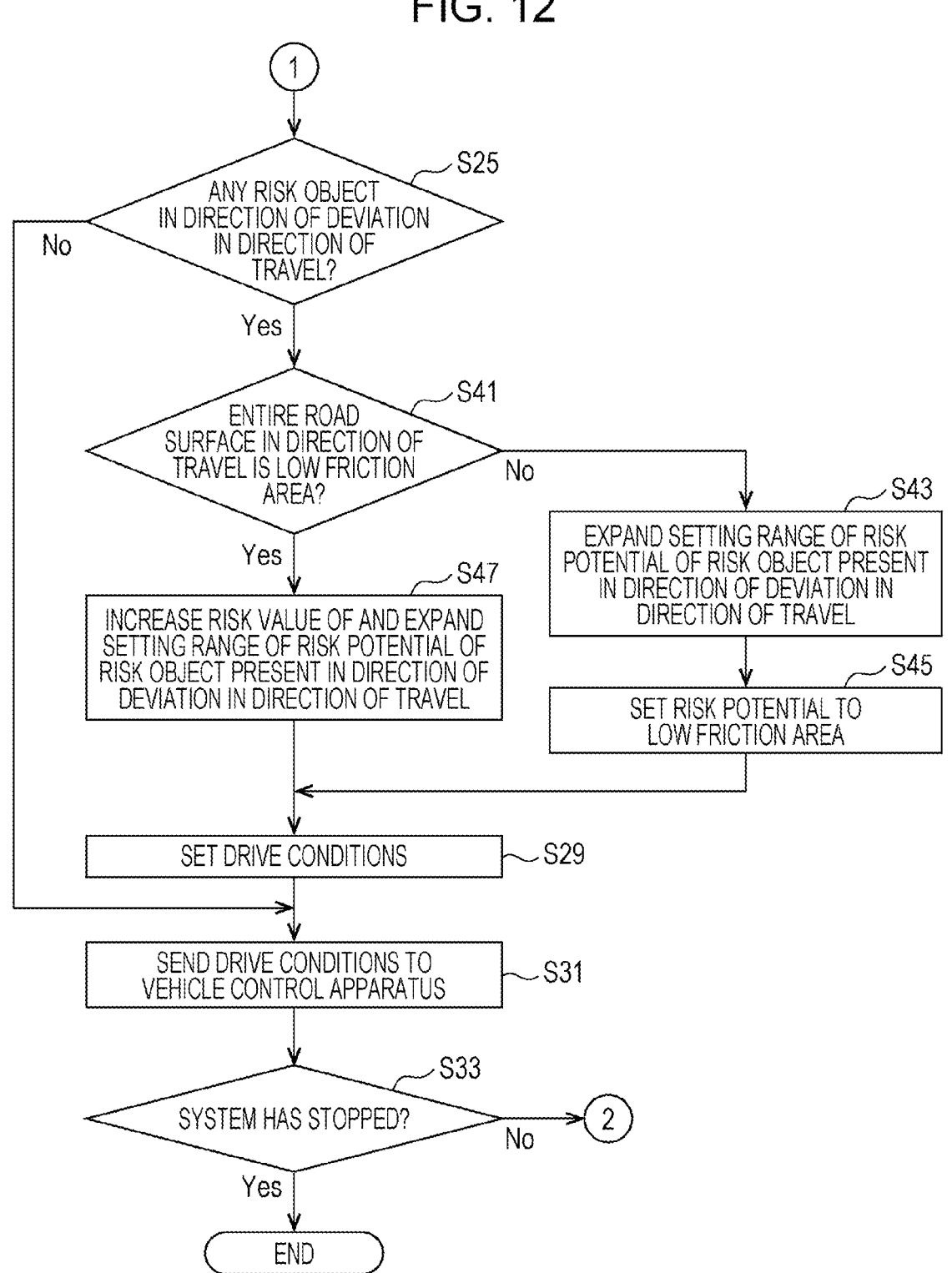
FIG. 12 is a flowchart illustrating a processing operation of the drive assist apparatus of the second embodiment.

FIG. 12 is a flowchart illustrating an example of the processing operation of the drive assist apparatus 50. The flowchart illustrated in FIG. 12 is replaceable with FIG. 9 illustrating the exemplary operation of the drive assist apparatus 50 according to the first embodiment, and the processing operation of the drive assist apparatus 50 according to the present embodiment is illustrated by FIG. 8 and FIG. 12. In one example, in the present embodiment, instead of the processing in step S27 illustrated in the flowchart of FIG. 9, the processing in steps S41 to S47 illustrated in the flowchart of FIG. 12 is executed.

In accordance with the procedure described in the first embodiment, the drive assist apparatus 50 executes the processing from step S11 to step S23 illustrated in FIG. 8. Next, the drive condition setter 67 determines whether there is a risk object in the direction of deviation in the direction of travel of the vehicle 1 (step S25). In the case where there is no risk object in the direction of deviation in the direction of travel of the vehicle 1 (S25/No), the drive condition setter 67 proceeds to step S31 as it is, sets a target steering angle and a target acceleration/deceleration speed on the basis of information on the target track and the target vehicle speed set in step S21, and sends these items of information to the vehicle control apparatus 41 (step S31).

In contrast, in the case where there is a risk object in the direction of deviation in the direction of travel of the vehicle 1 (S25/Yes), the risk map generator 65 determines, on the basis of the determination result in step S17, whether the entire road surface in the direction of travel of the vehicle 1 is a low friction area (step S41). For example, the risk map generator 65 may determine, on the road where the vehicle 1 is driving, whether the entire road surface ahead of the vehicle 1, whose distance from the vehicle 1 is within a certain range, is a low friction area. The risk map generator 65 may determine whether a certain proportion (such as 80%) or more of the road surface within the certain range is a low friction area.

In the case where the entire road surface in the direction of travel of the vehicle 1 is not a low friction area (S41/No), the risk map generator 65 performs, as in the processing in step S27 described in the first embodiment, correction to expand the setting range of the risk potential of the risk object which is present in the direction of deviation in the direction of travel (step S43). In one example, using the coefficient R representing the road surface state of the low friction area, the risk map generator 65 sets the risk potential of the risk object using Equation (1) above.

Next, the risk map generator 65 sets a risk potential to the low friction area (step S45). In one example, using the coefficient R representing the road surface state of the low friction area, the risk map generator 65 sets the risk potential of the low risk area using Equation (2) above.

In contrast, in the case where the entire road surface in the direction of travel of the vehicle 1 is a low friction area (S41/Yes), the risk map generator 65 increases the risk value of the risk potential of the risk object which is present in the direction of deviation in the direction of travel, and performs correction to expand the setting range of the risk potential (step S47). In one example, using the coefficient R representing the road surface state of the low friction area, the risk map generator 65 sets the risk potential of the risk object using Equation (3) above.

Next, the drive condition setter 67 sets drive conditions of the vehicle 1 on the basis of the risk map reflecting the corrected risk potential and information on the drive state of the vehicle 1 (step S29). Next, the drive condition setter 67 sets a target steering angle and a target acceleration/deceleration speed on the basis of information on the set target track and target vehicle speed, and sends these items of information to the vehicle control apparatus 41 (step S31).

Next, the drive condition setter 67 determines whether the on-board system has stopped (step S33). In the case where the on-board system has stopped (S33/Yes), the process executed by the controller 51 ends. In contrast, in the case where the on-board system has not stopped (S33/No), the process returns to step S13, and the processing in each of the steps described so far is repeatedly executed.

As described above, in the case where there is a risk object in the direction of deviation in the direction of travel of the vehicle 1, like the drive assist apparatus 50 according to the first embodiment, the drive assist apparatus 50 according to the second embodiment of the disclosure expands the setting range of the risk potential of the risk object. In addition, in the case where a low friction area is formed in part of the road surface ahead in the direction of travel of the vehicle 1, the drive assist apparatus 50 according to the present embodiment sets a risk potential to the low friction area. Accordingly, as compared with the target track (T1) set on the basis of the risk potential before the expansion, the target track (T3) is set so as to pass a position more distant from the risk object. In addition, the probability that the vehicle 1 will pass the low friction area is reduced, thereby reducing the probability of slippage of the vehicle 1. Therefore, the risk of collision with the risk object may be reduced.

In addition, in the case where the entire road surface ahead in the direction of travel of the vehicle 1 is a low friction area, the drive assist apparatus 50 according to the present embodiment increases the risk potential of a risk object and expands the setting range of the risk potential. Accordingly, the target track (T4) is set so as to pass a position yet more distant from the risk object. Therefore, the risk of collision with the risk object may be reduced.

In addition, the drive assist apparatus 50 according to the present embodiment sets the risk potential of a low friction area using Equation (2) above in which the road surface friction coefficient μ is reflected in the slope of the risk potential. For this reason, the setting range of the risk potential is expanded in accordance with the road surface state of the low friction area, and a difference in target track before and after the correction may be prevented from becoming excessively large.

In addition, the drive assist apparatus 50 according to the present embodiment sets the risk potential of a risk object using Equation (3) in which the road surface friction coefficient μ is reflected in the maximum value and the slope of the risk potential. For this reason, the risk potential is increased and the setting range of the risk potential is expanded in accordance with the road surface state of the low friction area, and a difference in target track before and after the correction may be prevented from becoming excessively large.

3. Third Embodiment

Next, a drive assist apparatus according to a third embodiment of the disclosure will be described.

In the drive assist apparatus according to the third embodiment, the drive assist apparatus 50 according to the first embodiment or the second embodiment is further configured to correct the risk potential of each risk object on the basis of the sensitivity of the driver of the vehicle 1 to each risk object, and to reflect the corrected risk potential in a risk map. Hereinafter, points of the drive assist apparatus according to the present embodiment that are different from the first embodiment and the second embodiment will be mainly described.

3-1. Exemplary Configuration

Figure 13:
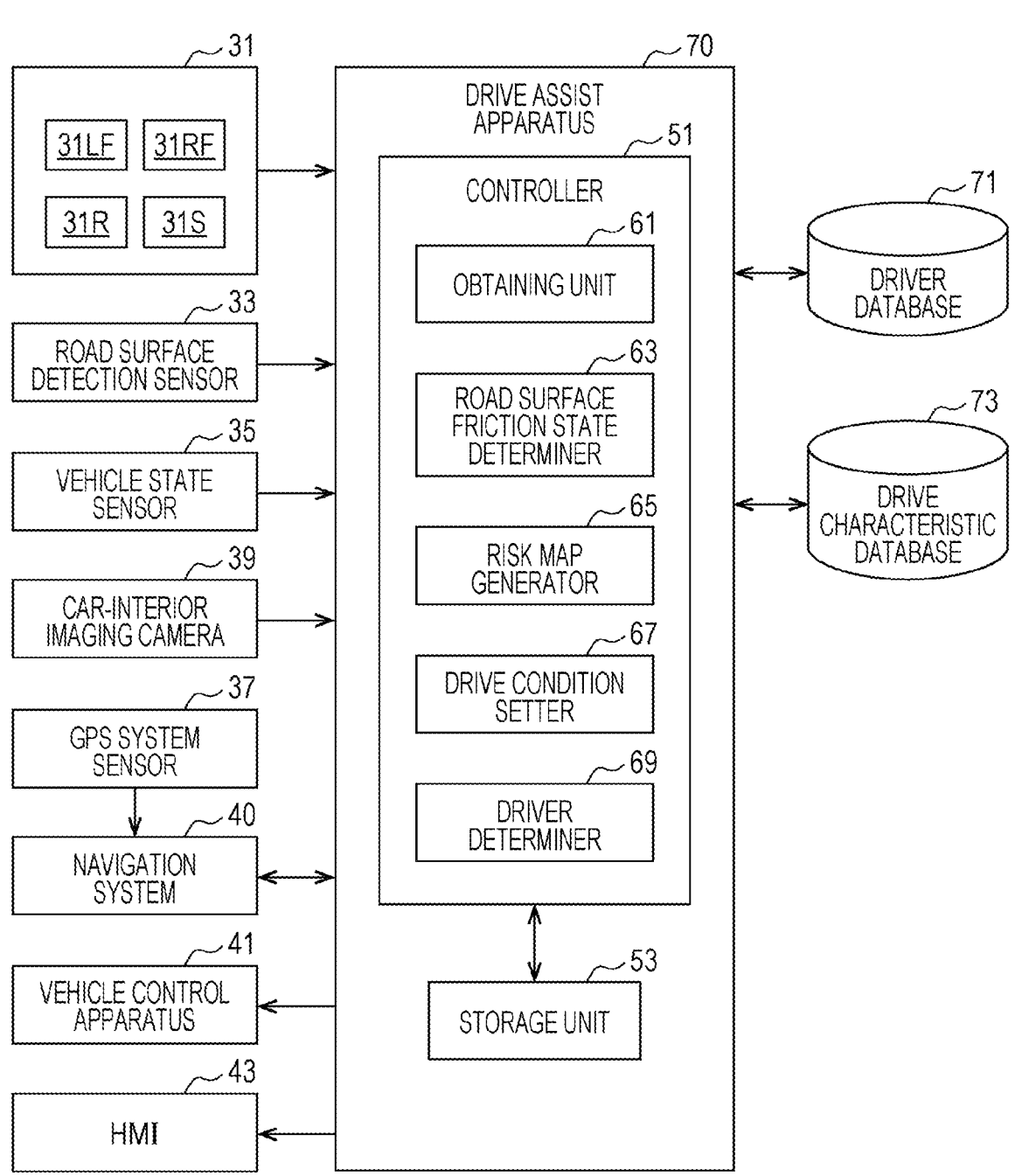
FIG. 13 is a block diagram illustrating an exemplary configuration of a drive assist apparatus according to a third embodiment.

FIG. 13 is a block diagram illustrating an exemplary configuration of a drive assist apparatus 70 according to the present embodiment.

The drive assist apparatus 70 includes the controller 51 and the storage unit 53. The surrounding environment sensor 31, the road surface detection sensor 33, and the vehicle state sensor 35 are connected to the drive assist apparatus 70 via communication means such as dedicated lines, CAN, or LIN. In addition, the navigation system 40, the vehicle control apparatus 41, and the HMI 43 are connected to the drive assist apparatus 70 via communication means such as dedicated lines, CAN, or LIN. Furthermore, a car-interior imaging camera 39, a driver database 71, and a drive characteristic database 73 are connected to the drive assist apparatus 70 according to the present embodiment via communication means such as dedicated lines, CAN, or LIN.

The car-interior imaging camera 39 is disposed so as to be capable of imaging the driver of the vehicle 1, and is used for identifying the driver. The car-interior imaging camera 39 includes an imaging device such as CCD or CMOS, and images the car interior to generate image data. The car-interior imaging camera 39 sends the generated image data to the drive assist apparatus 70. One or more car-interior imaging cameras 39 may be provided. Note that the car-interior imaging camera 39 is not the only possible means for identifying the driver, and, for example, it may be configured to allow the driver to register identification information in the drive assist apparatus 70.

3-2 Databases

The drive assist apparatus 70 is connected to the driver database 71 and the drive characteristic database 73 to be able to communicate with the driver database 71 and the drive characteristic database 73. The driver database 71 and the drive characteristic database 73 each include a storage element such as RAM, or an updatable recording medium such as a hard disk drive (HDD), a compact disk (CD), a digital versatile disk (DVD), a solid state drive (SSD), a Universal Serial Bus (USB) flash drive, or a storage device. Note that the type of recording medium is not particularly limited. One or all of the driver database 71 and drive characteristic database 73 may be mounted on the vehicle 1 or may be stored in a server capable of communicating with the drive assist apparatus 70 via wireless communication means such as mobile communication. In addition, each database may be configured as a single database.

Driver Database

The driver database 71 is a database that records identification information for identifying the driver of the vehicle 1. The identification information may be, for example, an identification number or an identification symbol. Note that the identification information is not limited to the above examples.

Drive Characteristic Database

The drive characteristic database 73 is a database that records information on each driver's sensitivity to each risk object. The sensitivity to each risk object is set at, for example, a plurality of levels for each risk object. Information on each sensitivity is information representing the distance at which, while driving the vehicle 1, each driver feels uneasy or scared of each risk object, and is reflected in a coefficient for correcting the basic risk potential $RP_i$ set in advance for each risk object.

Each driver's sensitivity to each risk object may be, for example, information set on the basis of information on a questionnaire response result obtained in advance. In one example, data may be obtained by asking each driver to answer to which risk object and how close to it the driver would feel uneasy or scared, and evaluating the distance to the risk object at a plurality of levels. Note that the method of setting and collecting information on the sensitivity to each risk object is not limited to the above examples, and information on the sensitivity may be set using an appropriate method. Information on the sensitivity is recorded in association with the driver's identification information.

Note that information on each driver's sensitivity to each risk object may be data obtained by learning a risk felt by the driver for the risk object when the driver is manually driving the vehicle 1.

3-3. Functional Configuration

As illustrated in FIG. 13, the controller 51 of the drive assist apparatus 70 includes, along with the obtaining unit 61, road surface friction state determiner 63, risk map generator 65, and drive condition setter 67, which are described in the first embodiment, a driver determiner 69. These units are functions realized by executing computer programs by a processor such as a CPU, and some or all of these units may be configured using an analog circuit.

The driver determiner 69 executes a process of identifying the driver of the vehicle 1 on the basis of image data sent from the car-interior imaging camera 39. Note that the driver determiner 69 may identify the driver of the vehicle 1 on the basis of information registered by the driver or an occupant via an input device such as a touchscreen.

The basic functions of the obtaining unit 61, road surface friction state determiner 63, risk map generator 65, and drive condition setter 67 may be the same as or similar to the units of the drive assist apparatus 50 according to the first embodiment and the second embodiment. Note that, in the present embodiment, the risk map generator 65 generates a risk map by further using information on each driver's sensitivity to each risk object.

The risk map generator 65 reflects information on the driver's sensitivity to the risk object when setting the risk potential in the processing operation executed by the drive assist apparatus 50 according to the first embodiment or the second embodiment. In one example, the risk map generator 65 is configured to expand the setting range of the risk potential as the driver's sensitivity to the risk object is higher.

For example, in Equations (1) and (3) above indicating the risk potential RP$_i$ set to the risk object, it is set so that the slope coefficient $\sigma_i$, which defines the rate of decrease in risk potential with respect to the distance from the coordinates $x_0$, $y_0$ of the reference position of the risk object, is multiplied by the coefficient s of the sensitivity to each risk object. In short, in the present embodiment, the risk potential RP$_i$ of the risk object is set using Equations (4) and (5) below instead of Equations (1) and (3) above:

$$RP_i = C_{i-}\text{var} \cdot \exp\left\{-\frac{(x-x_0)^2}{\sigma_i \cdot s \cdot R^2} - \frac{(y-y_0)^2}{\sigma_i \cdot s \cdot R^2}\right\} \quad (4)$$

RP$_i$: risk value;
C$_{i-}$var: gain;
$\sigma_i$: slope coefficient;
R: coefficient representing the road surface state;
$x_0$, $y_0$: coordinates of the reference position of the risk object;
s: coefficient representing the sensitivity to the risk object; and
i: numbering to distinguish the risk object.

$$RP_i = R \cdot C_{i-}\text{var} \cdot \exp\left\{-\frac{(x-x_0)^2}{\sigma_i \cdot s \cdot R^3} - \frac{(y-y_0)^2}{\sigma_i \cdot s \cdot R^3}\right\} \quad (5)$$

RP$_i$: risk value;
C$_{i-}$var: gain;
$\sigma_i$: slope coefficient;
R: coefficient representing the road surface state;
$x_0$, $y_0$: coordinates of the reference position of the risk object;
s: coefficient representing the sensitivity to the risk object; and
i: numbering to distinguish the risk object.

Figure 14:
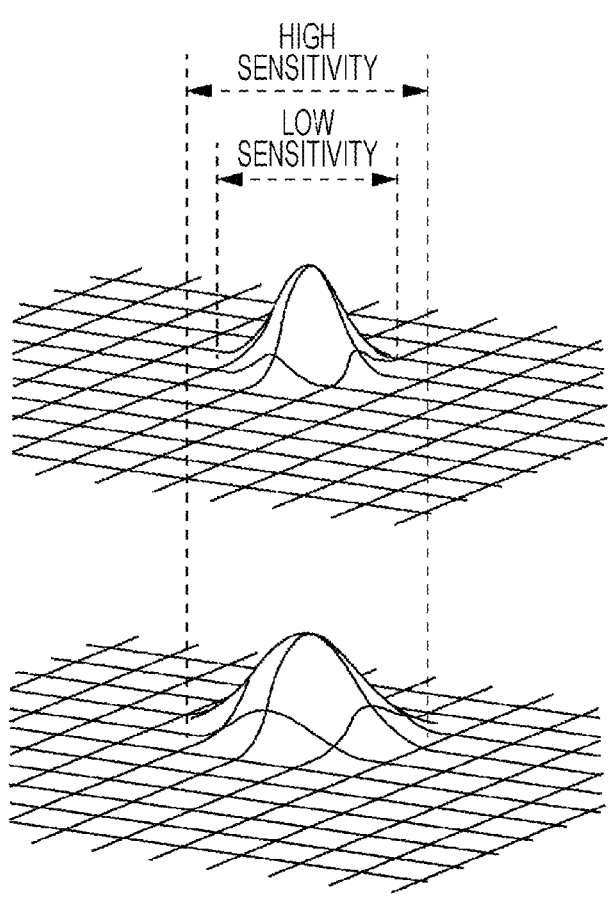
FIG. 14 is an explanatory diagram illustrating a risk potential set in accordance with a driver's sensitivity to a risk object.

The coefficient s representing the sensitivity to the risk object may be a value obtained by evaluating the distance at which each driver feels uneasy or scared of the risk object into, for example, one of the levels "1" to "4". The greater the distance at which the driver feels uneasy or scared, the greater the value of the coefficient s. In short, the coefficient s representing the sensitivity to the risk object is a value that is greater as the distance at which the driver feels uneasy or scared of the risk object is farther. Therefore, as illustrated in FIG. 14, the higher the sensitivity to the risk object, the more the setting range of the risk potential is expanded.

Note that the coefficient s representing the sensitivity to the risk object may be set in accordance with not only the distance from the vehicle 1 to the risk object, but also the speed of the vehicle 1 or the relative speed of the risk object with respect to the vehicle 1.

3-4. Operation of Drive Assist Apparatus

Next, an exemplary operation of the drive assist apparatus 70 according to the present embodiment will be concretely described.

Figure 15:
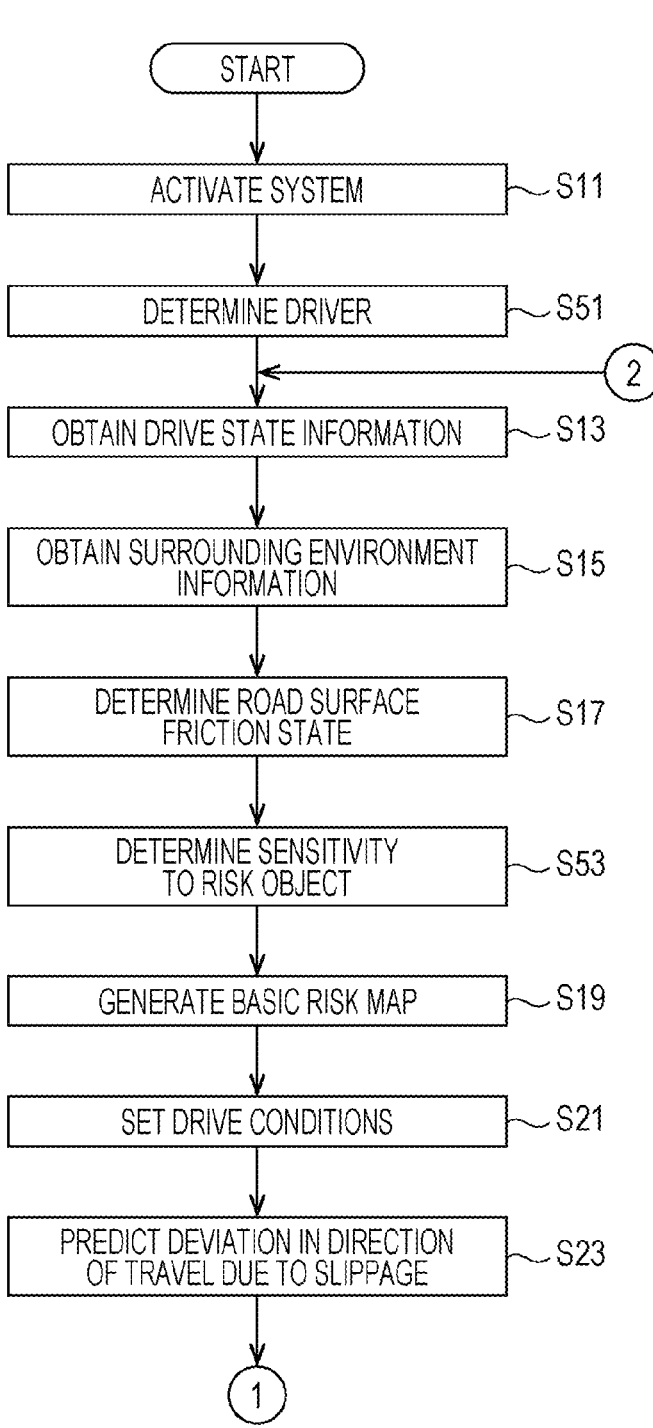
FIG. 15 is a flowchart illustrating a processing operation of the drive assist apparatus of the third embodiment.

FIG. 15 is a flowchart illustrating an example of the processing operation of the drive assist apparatus 70. The flowchart illustrated in FIG. 15 is replaceable with FIG. 8 illustrating the exemplary operation of the drive assist apparatus 50 according to the first embodiment, and the processing operation of the drive assist apparatus 70 according to the present embodiment is illustrated by FIG. 15 and FIG. 9 or FIG. 15 and FIG. 12. In one example, in the present embodiment, processing in steps S51 and S53 illustrated in FIG. 15 is added to the flowchart illustrated in FIG. 8. In addition, in the present embodiment, Equation (4) above is used instead of Equation (1) above when setting a risk potential to the risk object in step S19 illustrated in FIG. 15, step S27 illustrated in FIG. 9, and step S43 illustrated in FIG. 12. In addition, in the present embodiment, Equation (5) above is used instead of Equation (3) above when setting a risk potential to the risk object in step S47 illustrated in FIG. 12.

In one example, in response to activation of the on-board system (step S11), the driver determiner 69 of the controller 51 executes a process of identifying the driver of the vehicle 1 (step S51). For example, the driver determiner 69 executes a face recognition process using image data sent from the car-interior imaging camera 39, and detects the driver of the vehicle 1 who sits in the driver's seat. In addition, the driver determiner 69 extracts the feature amount of the driver's face, compares this feature amount with feature amount data accumulated in the driver database 71, and identifies the relevant driver. The driver determiner 69 records identification information of the identified driver in the storage unit 53. In the case where data of the relevant driver is not recorded in the driver database 71, the driver determiner 69 records in the storage unit 53 that there is no identification information of the driver.

In addition, after executing the process of obtaining information on the drive state of the vehicle 1 (step S13), the process of obtaining information on the surrounding environment (step S15), and the process of determining the road surface friction state (step S17), the risk map generator 65 determines the driver's sensitivity to the detected risk object (step S53). In one example, the risk map generator 65 refers to the drive characteristic database 73, and reads information on the sensitivity to the risk object, which corresponds to the identification information of the identified driver. In addition, the risk map generator 65 sets the coefficient s representing the sensitivity to the risk object, on the basis of information on the sensitivity corresponding to the type of the detected risk object.

Hereinafter, the controller 51 executes the processing in steps S19 to S23, and further executes the processing in each step along the flowchart in FIG. 9 or FIG. 12. Accordingly, the driver's sensitivity to the risk object is reflected in the risk potential set to the risk object in each of steps S19, S27, S43, and S47, and the more the driver feels uneasy or scared of the risk object, the more the setting range of the risk potential is expanded. Therefore, not only the risk of collision with the risk object due to slippage of the vehicle 1 is reduced, but also a target track that may suppress the driver's uneasiness or fear for the risk object may be set.

4. Fourth Embodiment

Next, a drive assist apparatus according to a fourth embodiment of the disclosure will be described.

In the drive assist apparatuses according to the first to third embodiments, information on the road surface friction state is used as information on an external environmental factor that may cause deviation of the drive track of the vehicle. In the drive assist apparatus according to the fourth embodiment, information on a wind direction is used as information on an external environmental factor.

In the case where the speed of the wind occurring around the vehicle 1 is fast, the drive track of the vehicle 1 may deviate in the downwind direction. For this reason, in the present embodiment, in the case where it is predicted that the drive track of the vehicle 1 will deviate due to the wind, the setting range of the risk potential of a risk object positioned in the direction of the deviation is expanded. Hereinafter, as the drive assist apparatus according to the present embodiment, an example in which information on a wind direction is used instead of information on the road surface friction state in the drive assist apparatus discussed in the first embodiment will be described.

Figure 16:
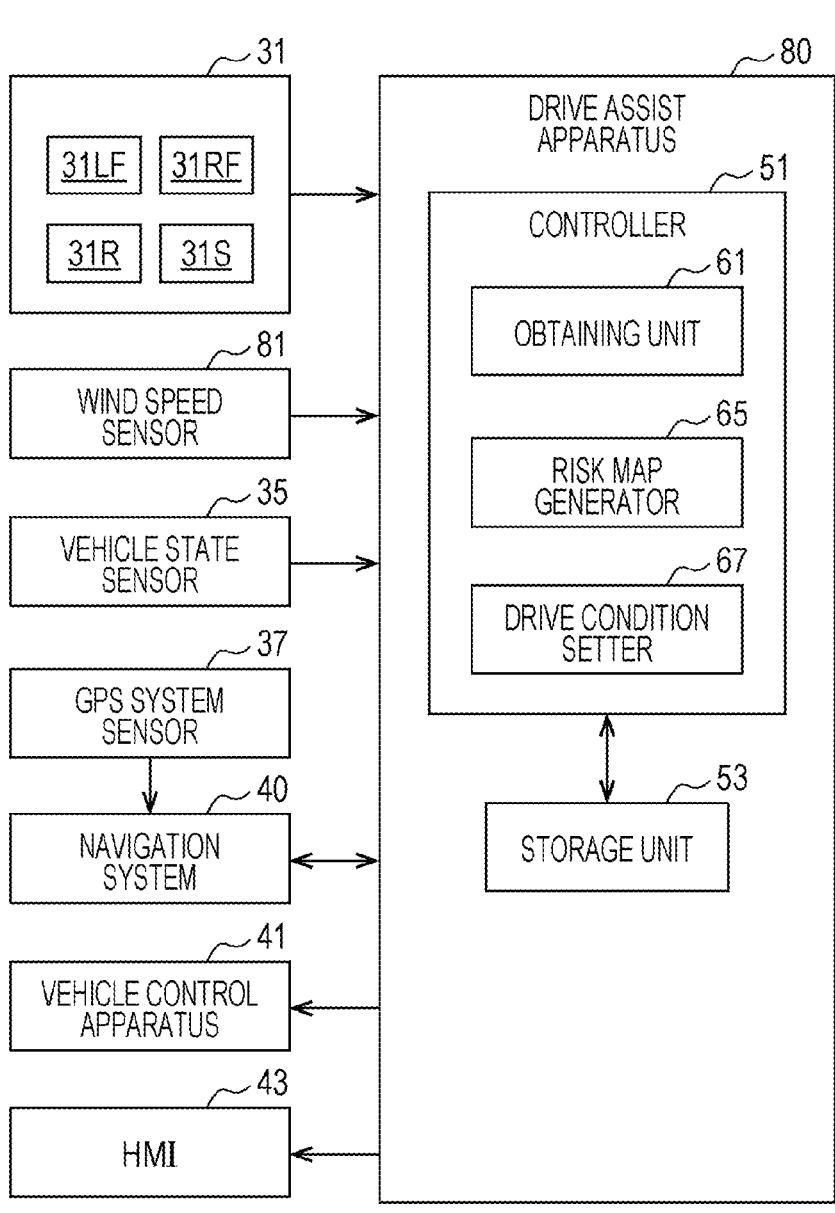
FIG. 16 is a block diagram illustrating an exemplary configuration of a drive assist apparatus according to a fourth embodiment.

FIG. 16 is a block diagram illustrating an exemplary configuration of a drive assist apparatus 80 according to the present embodiment.

Instead of a road surface detection sensor, a wind speed sensor 81 is connected to the drive assist apparatus 80. In the case of reflecting information on the road surface friction state along with information on a wind direction, the road surface detection sensor 33 may be connected to the drive assist apparatus 80, and the controller 51 may include the road surface friction state determiner 63.

The wind speed sensor 81 detects the wind speed and direction in the drive area of the vehicle 1, and sends information on the detected wind speed and direction to the drive assist apparatus 80. The obtaining unit 61 of the controller 51 may obtain, along with information on the wind speed and direction detected by the wind speed sensor 81, weather information from a telematics service or the like via mobile communication means.

The risk map generator 65 executes a process of generating a risk map on the basis of information on the basic risk potential of a risk object present around the vehicle 1, and information on the wind speed and direction obtained by the obtaining unit 61. In one example, in the case where it is determined that the drive track of the vehicle 1 is affected by the wind, the risk map generator 65 is configured to expand the setting range of the risk potential as the wind speed is greater.

For example, while the vehicle 1 is driving on the target track of the vehicle 1 set in the case of not taking into consideration the effect of wind, if it is determined that a wind with a wind speed greater than or equal to a preset wind speed threshold will blow in a direction from the vehicle 1 to the risk object, the risk map generator 65 expands the setting range of the risk potential in accordance with the wind speed. The wind speed threshold may be a constant value, or may be a value set in accordance with the weight of the vehicle 1 or the road surface friction state.

For example, in Equation (1) above indicating the risk potential $RP_i$ set to the risk object, it is set so that the slope coefficient $\sigma_i$, which defines the rate of decrease in risk potential with respect to the distance from the coordinates $x_0$, $y_0$ of the reference position of the risk object, is multiplied by the coefficient w representing the effect of wind. In short, in the present embodiment, the risk potential $RP_i$ of the risk object is set using Equation (6) below instead of Equation (1) above:

$$RP_i = C_{i\_}\text{var} \cdot \exp\left\{-\frac{(x-x_0)^2}{\sigma_i \cdot w} - \frac{(y-y_0)^2}{\sigma_i \cdot w}\right\} \qquad (6)$$

$RP_i$: risk value;
$C_{i\_}$var: gain;
$\sigma_i$: slope coefficient;

w: coefficient representing the effect of wind;
$x_0$, $y_0$: coordinates of the reference position of the risk object; and
i: numbering to distinguish the risk object.

The coefficient w representing the effect of wind may be a value set in accordance with the magnitude of the wind speed from among values set in advance at a plurality of levels, or may be a value defined within a certain range by standardizing the reciprocal of the wind speed according to a preset criterion. The greater the wind speed, the greater the coefficient w representing the effect of wind, and accordingly, the setting range of the risk potential is expanded.

Figure 17:
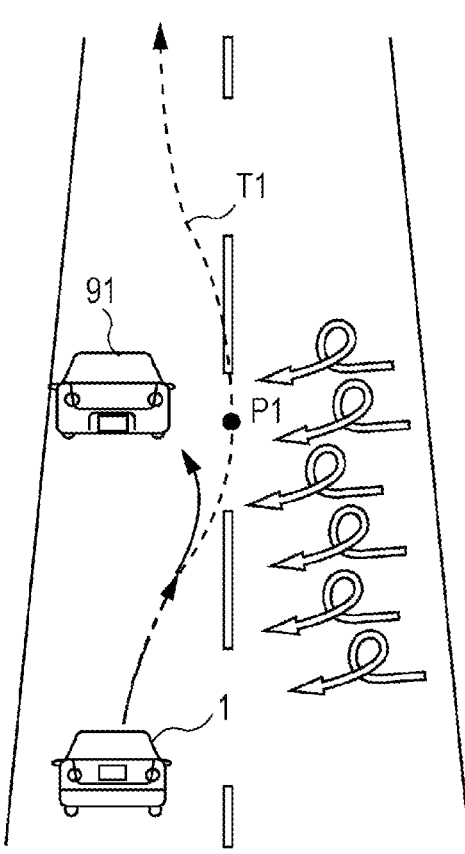
FIG. 17 is an explanatory diagram illustrating deviation of a drive track due to wind.
Figure 18:
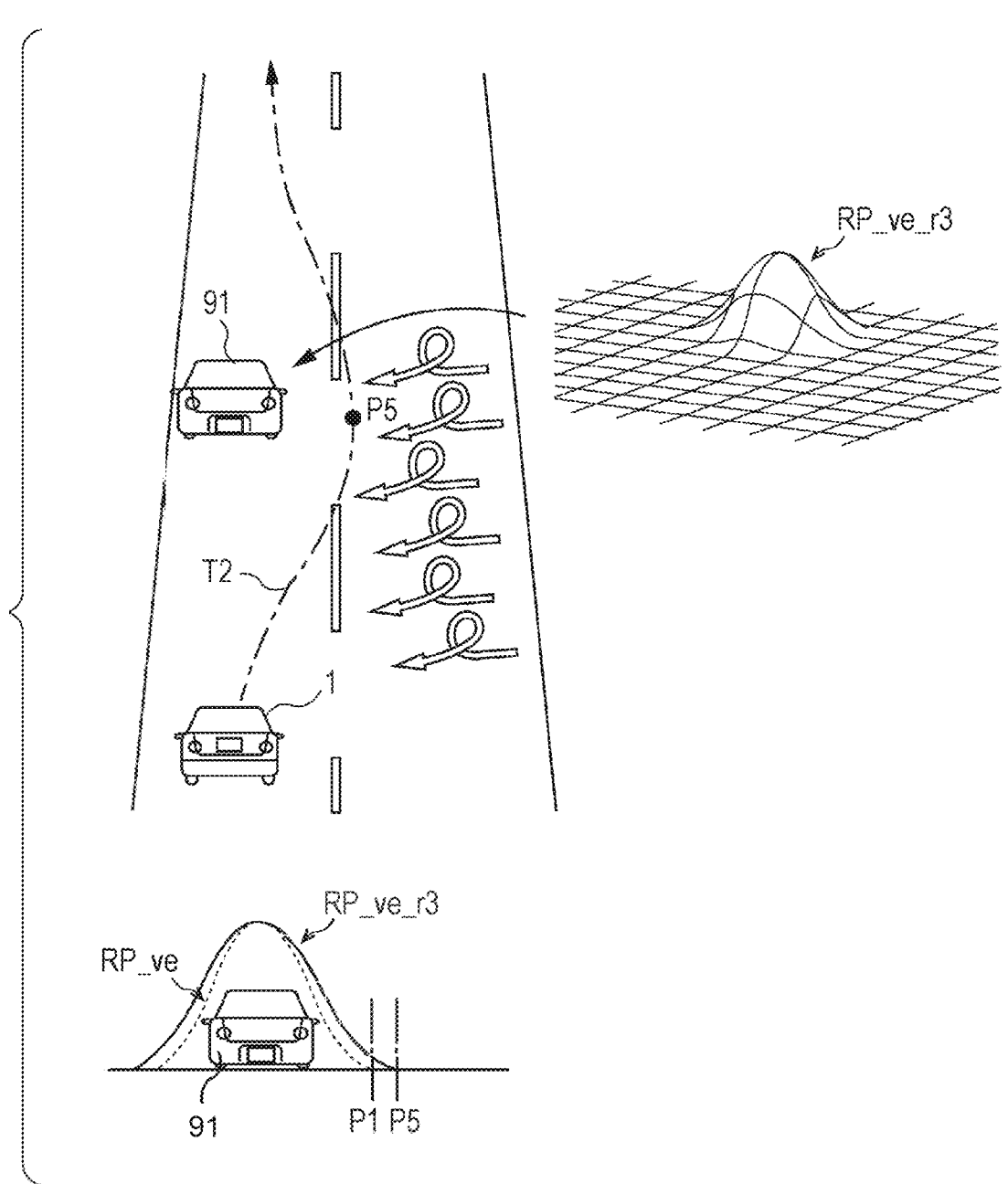
FIG. 18 is an explanatory diagram illustrating an example of a risk potential and a target track set by the drive assist apparatus of the fourth embodiment.

FIGS. 17 and 18 illustrate exemplary settings of a risk potential and a target track generated by the drive assist apparatus 80 according to the present embodiment. The exemplary settings of the risk potential and the target track illustrated in FIGS. 17 and 18 correspond to the exemplary setting in the scene illustrated in FIG. 4.

As illustrated in FIG. 17, in the case where a strong wind is blowing from the right side with respect to the direction of travel of the vehicle 1, it is predicted that the drive track of the vehicle 1 will deviate from the target track T1, which is set without taking into consideration the effect of the wind, and that the vehicle 1 will head toward the stopped vehicle 91. For this reason, as illustrated in FIG. 18, the risk map generator 65 performs correction to expand the setting range of the risk potential RP_ve of the stopped vehicle 91, which is present in the direction of deviation of the drive track, and sets the corrected risk potential RP_ve_r3. Accordingly, a target track T5 is set so as to pass a position P5, which is more distant from the stopped vehicle 91 than the position P1 illustrated in FIG. 17. Therefore, even in the case where the drive track of the vehicle 1 deviates due to the wind, the risk of collision with the stopped vehicle 91 may be reduced.

Figure 19:
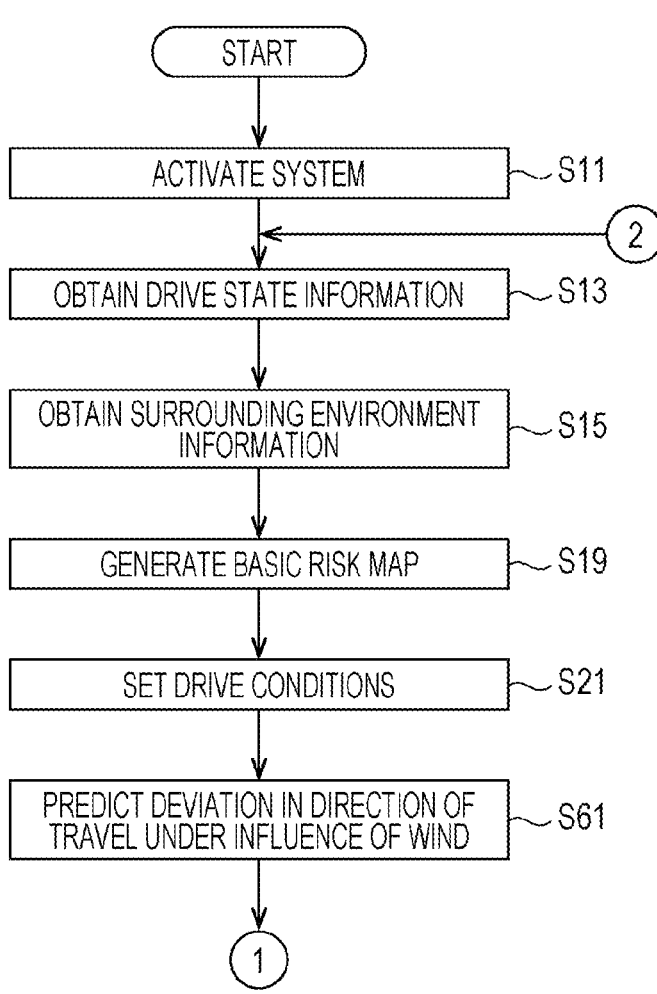
FIG. 19 is a flowchart illustrating a processing operation of the drive assist apparatus of the fourth embodiment.

FIG. 19 is a flowchart illustrating an example of the processing operation of the drive assist apparatus 80. The flowchart illustrated in FIG. 19 is replaceable with FIG. 8 illustrating the exemplary operation of the drive assist apparatus 50 according to the first embodiment, and the processing operation of the drive assist apparatus 80 according to the present embodiment is illustrated by FIG. 19 and FIG. 9. In one example, in the present embodiment, step S17 illustrated in FIG. 8 is omitted, and step S23 is replaced with step S61. In addition, in the present embodiment, Equation (6) above is used instead of Equation (1) above when setting a risk potential to the risk object in step S19 illustrated in FIG. 19 and step S27 illustrated in FIG. 9.

In one example, in response to activation of the on-board system (step S11), the controller 51 executes the process of obtaining information on the drive state of the vehicle 1 (step S13), the process of obtaining information on the surrounding environment (step S15), the basic risk map generating process (step S19), and the drive condition setting process (step S21). In step S19, the basic risk potential is set by setting the coefficient w representing the effect of wind in Equation (6) above to "1".

Next, the drive condition setter 67 determines, on the basis of information on the wind speed and direction, which is obtained by the obtaining unit 61, whether the drive track of the vehicle 1 will be affected by the wind. For example, while the vehicle 1 is driving on the target track, set in step S21, of the vehicle 1, if it is determined that a wind with a wind speed greater than or equal to a preset wind speed threshold will blow in a direction from the vehicle 1 to the risk object, the drive condition setter 67 determines that the drive track of the vehicle 1 will be affected by the wind. As described above, the wind speed threshold may be a constant value, or may be a value set in accordance with the weight of the vehicle 1 or the road surface friction state.

Hereinafter, the controller 51 executes the processing in each step along the flowchart in FIG. 9. In the case where it is predicted that the drive track of the vehicle 1 will be affected by the wind (S25/Yes), the wind effect is reflected in a risk potential set to each risk object in step S27, and the greater the wind speed, the more the setting range of the to-be-set risk potential is expanded. Therefore, by taking into consideration the predicted deviation of the drive track of the vehicle 1 due to the effect of the wind, a target track that may reduce the risk of collision with the risk object may be set.

As described above, in the case where the vehicle 1 is driving in a strong wind, the drive assist apparatus 80 according to the fourth embodiment of the disclosure predicts deviation in the direction of travel of the vehicle 1 due to the effect of the wind. In addition, in the case where there is a risk object in the direction of deviation in the direction of travel of the vehicle 1, the drive assist apparatus 80 expands the setting range of the risk potential of the risk object. Accordingly, the target track (T5) is set so as to pass a position distant from the risk object, as compared with the target track (T1) set on the basis of the risk potential before the expansion. Therefore, even in the case where the drive track of the vehicle 1 deviates due to the wind, the risk of collision with the risk object may be reduced.

In addition, the drive assist apparatus 80 according to the present embodiment sets the risk potential of the risk object using Equation (6) above in which the coefficient w representing the wind effect is reflected in the slope of the risk potential. For this reason, the setting range of the risk potential is expanded in accordance with the wind speed, and a difference in target track before and after the correction may be prevented from becoming excessively large.

Note that the drive assist apparatus 80 according to the fourth embodiment may be configured by being combined with the drive assist apparatus 50 or 70 according to the first, second, or third embodiment. In this case, Equations (1), (3), (4), and (5) above indicating a risk potential set to the risk object are each set so that the slope coefficient $\sigma_i$ is multiplied by the coefficient w representing the effect of wind.

In addition, although information on the wind speed and direction is used as information on an external environmental factor that may cause deviation of the drive track of the vehicle 1 in the fourth embodiment, information on an external environmental factor may be information on the slope angle of the road. In one example, in the case where the slope angle of the road is great, due to an inertial force associated with gravity or driving of the vehicle 1, the drive track of the vehicle 1 may deviate toward the bottom side of the sloping road. Therefore, the drive assist apparatus is configured to be able to obtain a sensor signal sent from a slope sensor that detects the slope of the road, and it is configured that, the greater the downward slope in the direction from the vehicle 1 to a risk object, the more the setting range of a risk potential set to the risk object is expanded. Accordingly, the target track (T5) is set so as to pass a position distant from the risk object, as compared with the target track (T1) set on the basis of the risk potential before the expansion. Therefore, even in the case where the drive track of the vehicle 1 deviates due to the slope of the road, the risk of collision with the risk object may be reduced.

Although the preferred embodiments of the disclosure have been described in detail above with reference to the accompanying drawings, the disclosure is not limited to these examples. Obviously, for those having ordinary knowledge in the field of technology to which the disclosure pertains, various changes or modifications are conceivable within the scope of the technical ideas described in the claims, and it is understood that these changes or modifications also naturally belong to the technical scope of the disclosure.

For example, although the vehicle 1 is equipped with all the functions of the drive assist apparatus in the above-described embodiments, the disclosure is not limited to these examples. For example, a server apparatus capable of communication via mobile communication means may be equipped with some of the functions of the drive assist apparatus, and the drive assist apparatus may be configured to send and receive data to and from the server apparatus.

In addition, the following modes also belong to the technical scope of the disclosure.

A drive assist apparatus in which, in the case where the road surface friction coefficient of a partial area ahead of a vehicle is smaller than the road surface friction coefficient of the surroundings, a processor is configured to set a risk potential to the road surface of the partial area.

A drive assist apparatus in which, in the case where the road surface friction coefficient of the entire road surface ahead of a vehicle is smaller than the road surface friction coefficient of a dry road surface, a processor is configured to increase the value of the risk potential of a risk object positioned in the direction of expected deviation.

A computer program applicable to a drive assist apparatus configured to set a drive condition of a vehicle based on a risk map generated by giving a risk potential to a risk object present around the vehicle, and a recording medium storing the computer program, the computer program causing one or more processors to execute a process, the process including: obtaining information on a surrounding environment of the vehicle; obtaining information on an external environmental factor that may cause deviation of a drive track of the vehicle; and expanding a setting range of a risk potential of a risk object positioned in a direction of the expected deviation based on the information on an external environmental factor.

As described above, according to the disclosure, a drive condition of a vehicle may be set by performing risk calculations that take into consideration the deviation of a drive track of the vehicle due to an external environmental factor.

The controller 51 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 51 including the obtaining unit 61, the road surface friction state determiner 63, the risk map generator 65, and the drive condition setter 67. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A drive assist apparatus configured to set a drive condition of a vehicle, the drive assist apparatus comprising:
one or more processors; and
one or more memories connected to the one or more processors and configured to store instructions causing the one or more processors to:
obtain information on a surrounding environment of the vehicle;
obtain information on an external environmental factor, the information on the external environmental factor including information on a road surface friction state ahead of the vehicle;
determine first risk values of a risk object, wherein the first risk values are is determined without using the information on the road surface friction state, despite the one or more processors having the information on the road surface friction state indicating that there is an area where wheel slippage is likely to occur, wherein the first risk values are distributed on a horizontal two-dimensional plane, wherein the first risk values range between a predetermined minimum value and a predetermined maximum value, and wherein when viewed from above the two-dimensional plane, a whole of the risk object is contained within a first range in which the first risk values are greater than the predetermined minimum value;
generate a first risk map, which represents a distribution of the first risk values on the two-dimensional plane, based on the information on the surrounding environment and the first risk values, without using the information on the road surface friction state;
generate a first target track for the vehicle to travel to avoid the risk object based on the first risk map, the first target track being set such that the vehicle passes through a first point on the two-dimensional plane corresponding to a position of minimum risk determined from the first risk map;
based on the first target track, determine a first drive condition for causing the vehicle to travel along the first target track, the first drive condition including control parameters for a steering angle and a speed of the vehicle;
evaluate, only after determining the first drive condition, whether the vehicle is predicted to deviate from the first target track toward the risk object based on the road surface friction state when controlled according to the first drive condition;
in response to determining that the vehicle is not predicted to deviate from the first target track toward the risk object, control the vehicle based on the first drive condition;
in response to determining that the vehicle is predicted to deviate from the first target track toward the risk object,
(1) perform correction, using the information on the road surface friction state, to expand the first range of the first risk values to obtain second risk values of the risk object that have a second range in which the second risk values are greater than the predetermined minimum value, the second range being wider than the first range,
(2) generate a second risk map based on the surrounding environment and the second risk values, and (3) generate a second target track more distant from the risk object than the first target track, the second target track being set such that the vehicle passes through a second point on the two-dimensional plane corresponding to a position of minimum risk determined from the second risk map, the second point being located farther from the risk object than the first point;
based on the second target track, determine a second drive condition for causing the vehicle to travel along the second target track, the second drive condition including the control parameters for the steering angle and the speed; and
control the vehicle based on the second drive condition.

2. The drive assist apparatus according to claim 1,
wherein the information on the external environmental factor further includes wind information on a wind speed and a wind direction, and
wherein the one or more processors are configured to:
determine whether the vehicle is predicted to deviate from the first target track due to an influence of the wind speed and the wind direction indicated by the wind information; and
determine the second risk values using the wind information in addition to the information on the road surface friction state.

3. The drive assist apparatus according to claim 2,
wherein the information on the external environmental factor further includes information on a road slope, and
wherein the one or more processors are configured to:
determine whether the vehicle is predicted to deviate from the first target track due to an influence of the road slope; and
determine the second risk values using the information on the road slope in addition to the information on the road surface friction state.

4. The drive assist apparatus according to claim 3,
wherein the one or more memories stores driver information on driver's sensitivity to potential risk objects, and
wherein the one or more processors are configured to adjust the setting range of the second risk values of the risk object based on the driver information.

5. The drive assist apparatus according to claim 2,
wherein the one or more memories stores driver information on driver's sensitivity to potential risk objects, and
wherein the one or more processors are configured to adjust the setting range of the second risk values of the risk object based on the driver information.

6. The drive assist apparatus according to claim 1,
wherein the information on the external environmental factor further includes information on a road slope, and
wherein the one or more processors are configured to:
determine whether the vehicle is predicted to deviate from the first target track due to an influence of the road slope; and
determine the second risk values using the information on the road slope in addition to the information on the road surface friction state.

7. The drive assist apparatus according to claim 6,
wherein the one or more memories stores driver information on driver's sensitivity to potential risk objects, and
wherein the one or more processors are configured to adjust the setting range of the second risk values of the risk object based on the driver information.

8. The drive assist apparatus according to claim 1,
wherein the one or more memories stores driver information on driver's sensitivity to potential risk objects, and wherein the one or more processors are configured to adjust the setting range of the second risk values of the risk object based on the driver information.

9. A drive assist apparatus configured to set a drive condition of a vehicle, the drive assist apparatus comprising:
one or more processors; and
one or more memories connected to the one or more processors and configured to store instructions causing the one or more processors to:
    obtain information on a surrounding environment of the vehicle;
    obtain information on an external environmental factor, the information on the external environmental factor including wind information on a wind speed and a wind direction;
    determine first risk values of a risk object, wherein the first risk values are determined without using the wind information, despite the one or more processors having the information on the wind speed and the wind direction, wherein the first risk values are distributed on a horizontal two-dimensional plane, wherein the first risk values range between a predetermined minimum value and a predetermined maximum value, and wherein when viewed from above the two-dimensional plane, a whole of the risk object is contained within a first range in which the first risk values are greater than the predetermined minimum value;
    generate a first risk map, which represents a distribution of the first risk values on the two-dimensional plane, based on the information on the surrounding environment and the first risk values, without using the wind information;
    generate a first target track for the vehicle to travel to avoid the risk object based on the first risk map, the first target track being set such that the vehicle passes through a first point on the two-dimensional plane corresponding to a position of minimum risk determined from the first risk map;
    based on the first target track, determine a first drive condition for causing the vehicle to travel along the first target track, the first drive condition including control parameters for a steering angle and a speed of the vehicle;
    evaluate, only after determining the first drive condition, whether the vehicle is predicted to deviate from the first target track toward the risk object due to the wind speed and the wind direction when controlled according to the first drive condition;
    in response to determining that the vehicle is not predicted to deviate from the first target track toward the risk object, control the vehicle based on the first drive condition;
    in response to determining that the vehicle is predicted to deviate from the first target track toward the risk object,
        (1) perform correction, using the wind information, to expand the first range of the first risk values to obtain second risk values of the risk object that have a second range in which the second risk values are greater than the predetermined minimum value, the second range being wider than the first range,
        (2) generate a second risk map based on the surrounding environment and the second risk values, and (3) generate a second target track more distant from the risk object than the first target track, the second target track being set such that the vehicle passes through a second point on the two-dimensional plane corresponding to a position of minimum risk determined from the second risk map, the second point being located farther from the risk object than the first point;
    based on the second target track, determine a second drive condition for causing the vehicle to travel along the second target track, the second drive condition including the control parameters for the steering angle and the speed; and
    control the vehicle based on the second drive condition.

10. The drive assist apparatus according to claim 9,
wherein the information on the external environmental factor further includes information on a road slope, and
wherein the one or more processors are configured to:
    determine whether the vehicle is predicted to deviate from the first target track due to an influence of the road slope; and
    determine the second risk values using the information on the road slope in addition to the wind information.

11. The drive assist apparatus according to claim 10,
wherein the one or more memories stores driver information on driver's sensitivity to potential risk objects, and
wherein the one or more processors are configured to adjust the setting range of the second risk values of the risk object based on the driver information.

12. The drive assist apparatus according to claim 9,
wherein the one or more memories stores driver information on driver's sensitivity to potential risk objects, and
wherein the one or more processors are configured to adjust the setting range of the second risk values potential of the risk object based on the driver information.

13. A drive assist apparatus configured to set a drive condition of a vehicle, the drive assist apparatus comprising:
one or more processors; and
one or more memories connected to the one or more processors and configured to store instructions causing the one or more processors to:
    obtain information on a surrounding environment of the vehicle;
    obtain information on an external environmental factor, the information on the external environmental factor including information on a road slope;
    determine first risk values of a risk object, wherein the first risk values are is determined without using the information on the road slope, despite the one or more processors having the information on the road slope, wherein the first risk values are distributed on a horizontal two-dimensional plane, wherein the first risk values range between a predetermined minimum value and a predetermined maximum value, and wherein when viewed from above the two-dimensional plane, a whole of the risk object is contained within a first range in which the first risk values are greater than the predetermined minimum value;
    generate a first risk map, which represents a distribution of the first risk values on the two-dimensional plane, based on the information on the surrounding environment and the first risk values, without using the information on the road slope;
    generate a first target track for the vehicle to travel to avoid the risk object based on the first risk map, the first target track being set such that the vehicle passes through a first point on the two-dimensional plane corresponding to a position of minimum risk determined from the first risk map;

based on the first target track, determine a first drive condition for causing the vehicle to travel along the first target track, the first drive condition including control parameters for a steering angle and a speed of the vehicle;

evaluate, only after determining the first drive condition, whether the vehicle is predicted to deviate from the first target track toward the risk object due to the road slope when controlled according to the first drive condition;

in response to determining that the vehicle is not predicted to deviate from the first target track toward the risk object, control the vehicle based on the first drive condition;

in response to determining that the vehicle is predicted to deviate from the first target track toward the risk object, (1) perform correction, using the information on the road slope, to expand the first range of the first risk values to obtain second risk values of the risk object that have a second range in which the second risk values are greater than the predetermined minimum value, the second range being wider than the first range, (2) generate a second risk map based on the surrounding environment and the second risk values, and (3) generate a second target track more distant from the risk object than the first target track, the second target track being set such that the vehicle passes through a second point on the two-dimensional plane corresponding to a position of minimum risk determined from the second risk map, the second point being located farther from the risk object than the first point;

based on the second target track, determine a second drive condition for causing the vehicle to travel along the second target track, the second drive condition including the control parameters for the steering angle and the speed; and control the vehicle based on the second drive condition.

14. The drive assist apparatus according to claim 13, wherein the one or more memories stores driver information on driver's sensitivity to potential risk objects, and wherein the one or more processors are configured to adjust the setting range of the second risk values of the risk object based on the driver information.

\* \* \* \* \*